US010009858B2

(12) United States Patent
Suzuki et al.

(10) Patent No.: US 10,009,858 B2
(45) Date of Patent: Jun. 26, 2018

(54) TERMINAL DEVICE, BASE STATION DEVICE, AND COMMUNICATION METHOD

(71) Applicant: Sharp Kabushiki Kaisha, Sakai, Osaka (JP)

(72) Inventors: Shoichi Suzuki, Sakai (JP); Tatsushi Aiba, Sakai (JP); Kimihiko Imamura, Sakai (JP); Kazunari Yokomakura, Sakai (JP); Hiroki Takahashi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days. days.

(21) Appl. No.: 15/521,889

(22) PCT Filed: Nov. 2, 2015

(86) PCT No.: PCT/JP2015/080911
§ 371 (c)(1),
(2) Date: Apr. 25, 2017

(87) PCT Pub. No.: WO2016/072382
PCT Pub. Date: May 12, 2016

(65) Prior Publication Data
US 2017/0318546 A1    Nov. 2, 2017

(30) Foreign Application Priority Data
Nov. 6, 2014  (JP) ................. 2014-225689

(51) Int. Cl.
*H04B 7/00*    (2006.01)
*H04W 52/34*   (2009.01)
*H04W 72/04*   (2009.01)

(52) U.S. Cl.
CPC ....... *H04W 52/34* (2013.01); *H04W 72/0473* (2013.01)

(58) Field of Classification Search
USPC .............................. 455/522, 69–70
See application file for complete search history.

(56) References Cited

U.S. PATENT DOCUMENTS

2017/0223641 A1* 8/2017 Haim .................. H04W 52/365

FOREIGN PATENT DOCUMENTS

WO    2014/133703 A1    9/2014

OTHER PUBLICATIONS

Ericsson et al., "D2D for LTE Proximity Services: Overview", R1-132028, 3GPPTSG-RAN WG1 Meeting #73, May 20-24, 2013.
(Continued)

*Primary Examiner* — Fayyaz Alam
(74) *Attorney, Agent, or Firm* — ScienBiziP, P.C.

(57) ABSTRACT

With respect to uplink carrier aggregation, transmit power in a serving cell (c) is determined on the basis of maximum output power ($P_{CMAX,c}$) for the serving cell c and total maximum output power ($P_{CMAX}$). The maximum output power ($P_{CMAX,\,c}$) for the serving cell (c) is based on maximum output power ($P_{PowerClass}$) defined by a power class corresponding to a band to which the serving cell (c) belongs, and the total maximum output power ($P_{CMAX}$) is based on maximum output power ($P_{PowerClass}$) defined by a power class corresponding to a combination of aggregated bands.

4 Claims, 16 Drawing Sheets

(56) References Cited

OTHER PUBLICATIONS

Ericsson, TP for 36.860: remaining RF RX requirements for uplink inter-band CA,TSG-RAN Working Group 4(Radio) meeting #72bis R4-146386, 3GPP, Oct. 6, 2014.

"3rd Generation Partnership Project; Technical Specification Group Radio Access Network; Evolved Universal Terrestrial Radio Access (E-UTRA); User Equipment (UE) radio transmission and reception (Release 12)", 3GPP Standard; 3GPP TS 36.101, 3rd Generation Partnership Project (3GPP), Mobile Competence Centre; 650, Route Des Lucioles ; F-06921 Sophia-Antipolis Cedex ;France, vol. RAN WG4, No. V12.5.0, Oct. 2, 2014 (Oct. 2, 2014), pp. 15-152.

* cited by examiner

FIG. 6

| Band and combination of bands | Corresponding power class |
|---|---|
| Band A | Power Class 1 (31 dBm) |
| Band B | Power Class 3 (23 dBm) |
| Band C | Power Class 3 (23 dBm) |
| Combination of Band A and Band B | Power Class 1 (31 dBm) |
| Combination of Band A and Band C | Power Class 1 (31 dBm) |
| Combination of Band B and Band C | Power Class 3 (23 dBm) |

FIG. 12

| Combination of bands | Band | Additional Tolerance $\Delta T_{IB,c}$ [dB] |
|---|---|---|
| Combination of Band A and Band B | Band A | 0.3 |
| | Band B | 0.3 |
| Combination of Band A and Band C | Band A | 0.5 |
| | Band C | 0.5 |
| Combination of Band B and Band C | Band B | 0.8 |
| | Band C | 0.4 |

FIG. 13

| Band | Power class 1 (31 dBm) | | Power class 3 (23 dBm) | |
|---|---|---|---|---|
| | Tolerance of $P_{CMAX,c}$ $T_L$ [dB] | Tolerance of $P_{CMAX,c}$ $T_H$ [dB] | Tolerance of $P_{CMAX,c}$ $T_L$ [dB] | Tolerance of $P_{CMAX,c}$ $T_H$ [dB] |
| Band A | −3 | +2 | −2 | +2 |
| Band B | −3 | +2 | −2 | +2 |
| Band C | −3.5 | +2 | −2.5 | +2 |

FIG. 14

| $P_{CMAX,c}$ [dBm] | Tolerance T ($P_{CMAX,c}$) [dB] |
|---|---|
| $23 < P_{CMAX,c} \leq 33$ | 2.0 |
| $21 < P_{CMAX,c} \leq 23$ | 2.0 |
| $20 < P_{CMAX,c} \leq 21$ | 2.5 |
| $19 < P_{CMAX,c} \leq 20$ | 3.5 |
| $18 < P_{CMAX,c} \leq 19$ | 4.0 |
| $13 < P_{CMAX,c} \leq 18$ | 5.0 |
| $8 < P_{CMAX,c} \leq 13$ | 6.0 |
| $-40 < P_{CMAX,c} \leq 8$ | 7.0 |

FIG. 15

| $P_{CMAX}$ [dBm] | Tolerance T ($P_{CMAX}$) [dB] | |
|---|---|---|
| | Intra-band with two active uplink serving cell | Inter-band with two active uplink serving cell |
| $23 < P_{CMAX} \leq 33$ | 2.0 | 2.0 |
| $21 < P_{CMAX} \leq 23$ | 2.0 | 2.0 |
| $20 < P_{CMAX} \leq 21$ | 2.5 | 2.5 |
| $19 < P_{CMAX} \leq 20$ | 3.5 | 3.5 |
| $18 < P_{CMAX} \leq 19$ | 4.0 | 4.0 |
| $13 < P_{CMAX} \leq 18$ | 5.0 | 5.0 |
| $8 < P_{CMAX} \leq 13$ | 6.0 | 6.0 |
| $-40 < P_{CMAX} \leq 8$ | 7.0 | 7.0 |

FIG. 16

TERMINAL DEVICE, BASE STATION DEVICE, AND COMMUNICATION METHOD

TECHNICAL FIELD

The present invention relates to a terminal device, an integrated circuit, and a communication method.

This application claims priority based on Japanese Patent Application No. 2014-225689 filed in Japan on Nov. 6, 2014, the contents of which are incorporated herein by reference.

BACKGROUND ART

In the 3rd Generation Partnership Project (3GPP), a radio access method (Evolved Universal Terrestrial Radio Access, EUTRA) and a radio access network (Evolved Universal Terrestrial Radio Access Network, EUTRAN) for cellular mobile communications have been considered. EUTRA and EUTRAN are also referred to as Long Term Evolution (LTE). In LTE, a base station device is also referred to as an evolved NodeB (eNodeB), and a terminal device is also referred to as user equipment (UE). LTE is a cellular communication system in which an area is divided into multiple cells to form a cellular pattern, each of the cells being served by a base station device. A single base station device may manage multiple cells.

In 3GPP, proximity based services (ProSe) has been considered. ProSe includes ProSe discovery and ProSe communication. ProSe discovery is a process that identifies that a terminal device is in proximity of a different terminal device, using EUTRA. ProSe communication is communication between two terminal devices that are in proximity of each other, the communication being performed through an EUTRAN communication path established between the two terminal devices. For example, the communication path may be established directly between the terminal devices.

ProSe discovery and ProSe communication are also referred to as device to device (D2D) discovery and D2D communication, respectively. Furthermore, ProSe discovery and ProSe communication are collectively referred to as ProSe. Moreover, D2D discovery and D2D communication are collectively referred to as D2D. A communication path is also referred to as a link.

NPL 1 describes that a subset of resource blocks is reserved for D2D, a network configures a set of D2D resources, and terminal devices are allowed to transmit D2D signals with the configured resources.

CITATION LIST

Non-Patent Document

[NON-PATENT DOCUMENT 1] NPL 1: "D2D for LTE Proximity Services: Overview". R1-132028, 3GPP TSG-RAN WG1 Meeting #73, 20 to 24 May 2013.

DISCLOSURE OF THE INVENTION

Problems to be Solved by the Invention

However, sufficient consideration has not been given to a terminal device that performs D2D and cellular communication simultaneously. An object of the present invention is to provide a terminal device capable of efficiently communicating with a base station device, an integrated circuit mounted on the terminal device, a communication method for the terminal device, a base station device communicating with the terminal device, an integrated circuit mounted on the base station device, and a communication method for the base station device.

Means for Solving the Problems (1) Aspects of the present invention are contrived to provide the following means. Specifically, a first aspect of the present invention is a terminal device including a power control unit determining transmit power in a serving cell c on the basis of maximum output power PCMAX, C for the serving cell c and total maximum output power PCMAX. With respect to uplink carrier aggregation, the maximum output power PCMAX, C for the serving cell c is based on maximum output power PPowerClass defined by a power class corresponding to a band to which the serving cell c belongs, and the total maximum output power PCMAX is based on maximum output power PPowerClass defined by a power class corresponding to a combination of aggregated bands.

(2) A second aspect of the present invention is a terminal device including a power control unit determining a power class corresponding to a band to which a serving cell c belongs, on the basis of the band to which the serving cell c belongs, and configuring maximum output power PCMAX, C for the serving cell c on the basis of maximum output power PPowerClass defined by the power class corresponding to the band to which the serving cell c belongs.

(3) In the second aspect of the present invention, the power control unit, with respect to uplink career aggregation, determines a power class corresponding to a combination of aggregated bands on the basis of the combination of aggregated bands, and configures total maximum output power PCMAX on the basis of maximum output power PPowerClass defined by the power class corresponding to the combination of aggregated bands.

(4) In the first aspect and second aspect of the present invention, the maximum output power PPowerClass defined by the power class corresponding to the combination of aggregated bands corresponds to any transmission bandwidth within a channel bandwidth of the aggregated bands.

(5) In the first aspect and second aspect of the present invention, the terminal device 1 includes a transmission unit transmitting information indicating the power class corresponding to the band.

(6) In the first aspect and second aspect of the present invention, the transmission unit transmits information indicating the power class corresponding to the combination of aggregated bands.

(7) A third aspect of the present invention is a communication method for a terminal device. The communication method includes the step of determining transmit power in a serving cell c on the basis of maximum output power PCMAX, C for the serving cell c and total maximum output power PCMAX. With respect to uplink, carrier aggregation, the maximum output power PCMAX, C for the serving cell c is based on maximum output power PPowerClass defined by a power class corresponding to a band to which the serving cell c belongs, and the total maximum output power PCMAX is based on maximum output power PPowerClass defined by a power class corresponding to a combination of aggregated bands.

(8) A fourth aspect of the present invention is a communication method for a terminal device. The communication method includes the steps of determining a power class corresponding to a band to which a serving cell c belongs, on the basis of the band to which the serving cell c belongs, and configuring maximum output power PCMAX, C for the serving cell c, on the basis of maximum output power PPowerClass defined by the power class corresponding to the band to which the serving cell c belongs.

(9) A fifth aspect of the present invention is an integrated circuit mounted on a terminal device. The integrated circuit causes the terminal device to perform the series of functions including determining transmit power in a serving cell c, on the basis of maximum output power PCMAX, C for the serving cell c and total maximum output power PCMAX. With respect to uplink carrier aggregation, the maximum output power PCMAX, C for the serving cell c is based on maximum output power PPowerClass defined by a power class corresponding to a band to which the serving cell c belongs, and the total maximum output power PCMAX is based on maximum output power PPowerClass defined by a power class corresponding to a combination of aggregated bands.

(10) A sixth aspect of the present invention is an integrated circuit mounted on a terminal device. The integrated circuit causes the terminal device to perform the series of functions including determining a power class corresponding to a band to which a serving cell c belongs, on the basis of the band to which the serving cell c belongs, and configuring maximum output power PCMAX, C for the serving cell c on the basis of maximum output power PPowerClass defined by the power class corresponding to the band to which the serving cell c belongs.

(11) A seventh aspect of the present invention is a base station device including a reception unit receiving information indicating a power class corresponding to a band and information indicating a power class corresponding to a combination of aggregated bands from a terminal device. Transmit power of the terminal device in a serving cell c is determined on the basis of maximum output power PCMAX, C for the serving cell c and total maximum output power PCMAX. With respect to uplink carrier aggregation, the maximum output power PCMAX, C for the serving cell c is based on maximum output power PPowerClass defined by the power class corresponding to the band to which the serving cell c belongs, and the total maximum output power PCMAX is based on maximum output power PPowerClass defined by the power class corresponding to the combination of aggregated bands.

(12) A seventh aspect of the present invention is a communication method for a base station device. The communication method includes the step of receiving information indicating a power class corresponding to a band and information indicating a power class corresponding to a combination of aggregated bands from a terminal device. Transmit power of the terminal device in a serving cell c is determined on the basis of maximum output power PCMAX, C for the serving cell c and total maximum output power PCMAX. With respect to uplink carrier aggregation, the maximum output power PCMAX. C for the serving cell c is based on maximum output power PPowerClass defined by the power class corresponding to the band to which the serving cell c belongs, and the total maximum output power PCMAX is based on maximum output power PPowerClass defined by the power class corresponding to the combination of aggregated bands.

(13) An eighth aspect of the present invention is an integrated circuit mounted on a base station device. The integrated circuit causes the base station device to perform the series of functions including receiving information indicating a power class corresponding to a band and information indicating a power class corresponding to a combination of aggregated bands from a terminal device. Transmit power of the terminal device in a serving cell c is determined on the basis of maximum output power PCMAX, C for the serving cell c and total maximum output power PCMAX. With respect to uplink carrier aggregation, the maximum output power PCMAX, C for the serving cell c is based on maximum output power PPowerClass defined by the power class corresponding to the band to which the serving cell c belongs, and the total maximum output power PCMAX is based on maximum output power PPowerClass defined by the power class corresponding to the combination of aggregated bands.

Effects of the Invention

According to the present invention, a terminal device can efficiently communicate with a base station device.

BRIEF DESCRIPTION OF THE DRAWINGS

FIG. 6 is a table showing an example of RP-Parameters-r10 according to the present embodiment.

FIG. 12 is a table showing an example of a correspondence between a band/a combination of bands and a power class according to a third embodiment.

FIG. 13 is a table showing an example of ΔTIB, c according to the third embodiment.

FIG. 14 is a table showing an example of tolerance (TL, TH) according to the third embodiment.

FIG. 15 is a table showing an example of tolerance Tc (PCMAX_X, c) according to the third embodiment.

FIG. 16 is a table showing an example of tolerance T (PCMAX_X) according to the third embodiment.

MODE FOR CARRYING OUT THE INVENTION

Embodiments of the present invention will be described below.

Figure 1:
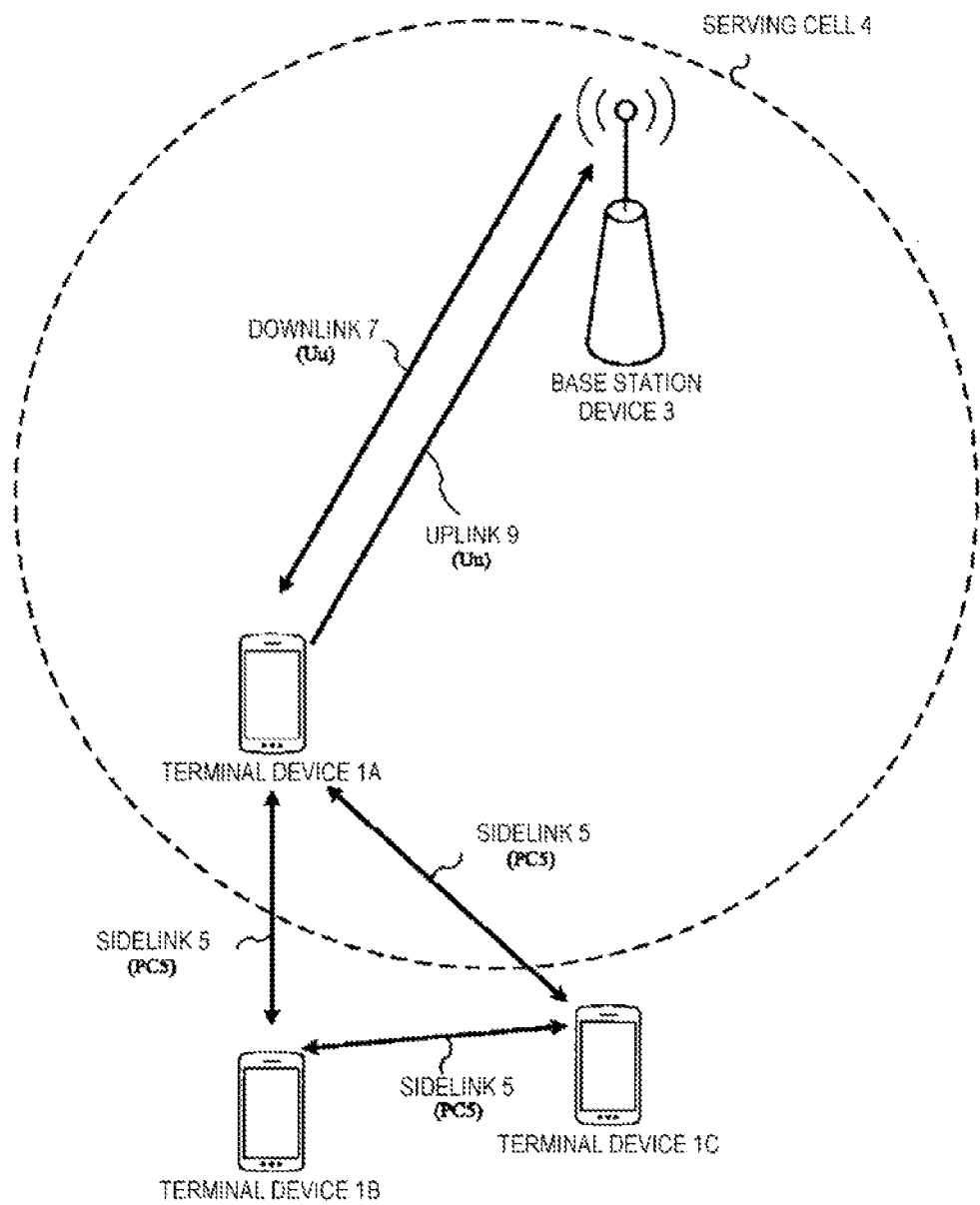
FIG. 1 is a conceptual diagram of a radio communication system according to the present embodiment.

FIG. 1 is a conceptual diagram of a radio communication system according to the present embodiment. In FIG. 1, the radio communication system includes terminal devices 1A to 1C and a base station device 3. The terminal devices 1A to 1C are each referred to as a terminal device 1. A serving cell 4 indicates an area covered by (coverage of) the base station device 3 (LTE or EUTRAN). The terminal device 1A is in-coverage of EUTRAN. The terminal device 1B and the terminal device 1C are out-of-coverage of EUTRAN.

Sidelinks 5 are links between the terminal devices 1. Each of the sidelinks 5 is also referred to as a PC5, a D2D communication path, a ProSe link, or a ProSe communication path. In the sidelink 5, D2D discovery and D2D communication are performed. D2D discovery is a process/procedure that identifies that the terminal device 1 is in proximity of another terminal device 1, using EUTRA. D2D communication is communication between multiple terminal devices 1 that are in proximity of each other, the communication being performed through an EUTRAN communication path established between the multiple terminal devices 1. For example, the communication path may be established directly between the terminal devices 1.

A downlink 7 is a link from the base station device 3 to the terminal device 1. An uplink 9 is a link from the terminal device 1 to the base station device 3. Through the uplink 9, a signal may be transmitted directly from the terminal device 1 to the base station device 3 without using any repeater. The uplink 5 and the downlink 7 may be collectively referred to as a Uu, a cellular link, or a cellular communication path. Communication between the terminal device 1 and the base station device 3 is also referred to as cellular communication or communication with EUTRAN.

Physical channels and physical signals according to the present embodiment will be described.

A downlink physical channel and a downlink physical signal are collectively referred to as a downlink signal. An uplink physical channel and an uplink physical signal are collectively referred to as an uplink signal. A sidelink physical channel and a sidelink physical signal are collectively referred to as a sidelink signal. The physical channels are used to transmit information output from a higher layer. The physical signals are not used to transmit the information output from the higher layer, but are used by a physical layer.

In FIG. 1, the following sidelink physical channels are used for the radio communication in the sidelink 9 between the terminal devices 1.

Physical sidelink broadcast channel (PSBCH)
Physical sidelink control channel (PSCCH)
Physical sidelink shared, channel (PSSCH)
Physical sidelink discovery channel (PSDCH)

The PSBCH is used to transmit information indicating a frame number in D2D. The PSCCH is used to transmit sidelink control information (SCI). The SCI is used for scheduling of the PSSCH. The PSSCH is used to transmit D2D communication data (sidelink shared channel, SL-SCH). The PSDCH is used to transmit D2D discovery data (sidelink discovery channel, SL-DCH).

In FIG. 1, the following sidelink physical signals are used for the D2D radio communication.

Sidelink synchronization signal
Sidelink demodulation reference signal

From the viewpoint of the terminal device 1 that performs transmission, the terminal device 1 can operate in two modes (mode 1 and mode 2) of resource allocation for D2D communication.

In mode 1, EUTRAN (base station device 3) schedules precise resources to be used by the terminal device 1 to transmit a communication signal (D2D data and D2DSA).

In mode 2, the terminal device 1 selects resources from a resource pool for transmission of the communication signal (D2D data and D2DSA). The resource pool is a set of resources. The resource pool for mode 2 may be configured/restricted in a semi-static manner by EUTRAN (base station device 3). Alternatively, the resource pool for mode 2 may be pre-configured.

The terminal device 1 that is capable of D2D communication and is in-coverage of EUTRAN may support mode 1 and mode 2. The terminal device 1 that is capable of D2D communication and is out-of-coverage of EUTRAN may support mode 2 only.

Two types (type 1 and type 2) of D2D discovery procedure are defined.

The D2D discovery procedure of type 1 is a D2D discovery procedure in which resources for discovery signals are not allocated individually to the terminal devices 1. In other words, in the D2D discovery procedure of type 1, resources for discovery signals may be allocated to all the terminal devices 1 or a group of the terminal devices 1.

The D2D discovery procedure of type 2 is a D2D discovery procedure in which resources for discovery signals are allocated individually to the terminal devices 1. A discovery procedure in which resources are allocated individually for transmission instances of a discovery signal is referred to as a type 2A discovery procedure. A discovery procedure of type 2 in which resources are semi-persistently allocated for transmission of a discovery signal is referred to as a type 2B discovery procedure.

In FIG. 1, the following uplink physical channels are used for the uplink radio communication.

Physical uplink control channel (PUCCH)
Physical uplink shared channel (PUSCH)
Physical random access channel (PRACH)

In FIG. 1, the following uplink physical signal is used for the uplink radio communication.

Uplink reference signal (UL RS)

In FIG. 1, the following downlink physical channels are used for the downlink radio communication.

Physical broadcast channel (PBCH)
Physical control format indicator channel (PCFICH)
Physical hybrid automatic repeat request indicator channel (PHICH)
Physical downlink control channel (PDCCH)
Enhanced physical downlink control channel (EPDCCH)
Physical downlink shared channel (PDSCH)
Physical multicast channel (PMCH)

In FIG. 1, the following downlink physical signals are used for the downlink radio communication.

Synchronization signal (SS)
Downlink reference signal (DL RS)

The SL-SCH and the SL-DCB are transport channels. The PUSCH, the PBCH, the PDSCH, and the PMCH are used for transmission of a transport channel. A channel used in the medium access control (MAC) layer is referred to as a transport channel. The unit of data on the transport channel used in the MAC layer is also referred to as a transport block (TB) or a MAC protocol data unit (PDU). Control of a hybrid automatic repeat request (HARQ) is performed for each transport block in the MAC layer. The transport block is a unit of data that the MAC layer delivers to the physical layer. In the physical layer, the transport block is mapped to a codeword, and coding processing is performed on a code word-by-codeword basis.

Configurations of devices according to the present embodiment will be described below.

Figure 2:
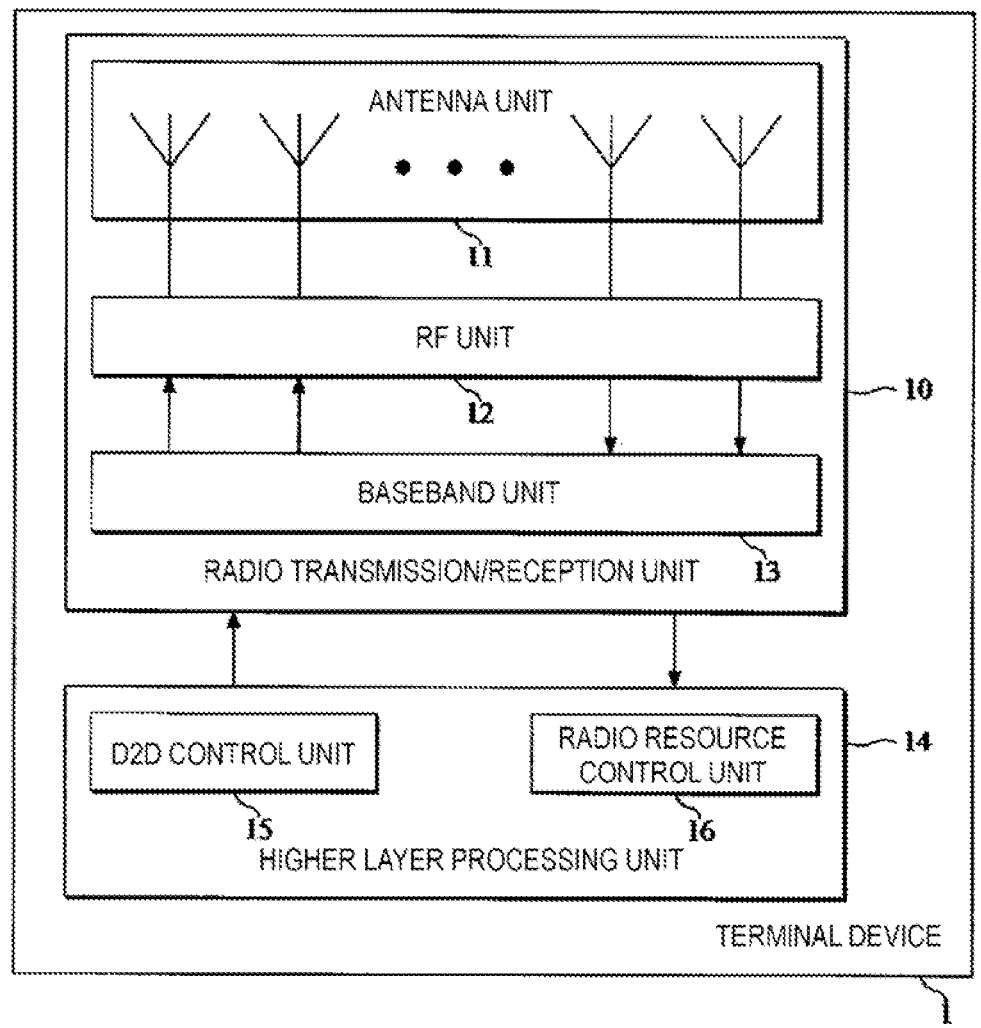
FIG. 2 is a schematic block diagram illustrating a configuration of a terminal device 1 according to the present embodiment.

FIG. 2 is a schematic block diagram illustrating a configuration of the terminal device 1 according to the present embodiment. As illustrated in FIG. 2, the terminal device 1 is configured to include a radio transmission/reception unit 10 and a higher layer processing unit 14. The radio transmission/reception unit 10 is configured to include an antenna unit 11, a radio frequency (RF) unit 12, and a baseband unit 13. The higher layer processing unit 14 is configured to include a D2D control unit 15 and a radio resource control unit 16. The radio transmission/reception unit 10 is also referred to as a transmission unit or a reception unit.

The higher layer processing unit 14 outputs the uplink data (transport block) generated by a user operation or the like, to the radio transmission/reception unit 10. The higher layer processing unit 14 performs processing of the medium access control (MAC) layer, the packet data convergence protocol (PDCP) layer, the radio link control (RLC) layer, and the radio resource control (RRC) layer.

The radio resource control unit 16 included in the higher layer processing unit 14 manages various pieces of configuration information/parameters of the terminal device 1 itself. The radio resource control unit 16 sets the various pieces of configuration information/parameters on the basis of a higher layer signal received from the base station device 3. In other words, the radio resource control unit 16 sets the various configuration information/parameters on the basis of the information indicating the various pieces of configuration information/parameters received from the base station device 3. The radio resource control unit 16 may control maximum output power.

The D2D control unit 15 included in the higher layer processing unit 14 controls D2D discovery and/or D2D communication on the basis of the various pieces of configuration information/parameters managed by the radio resource control unit 16. The D2D control unit 15 may generate information associated with D2D to be transmitted to another terminal device 1 or the EUTRAN (base station device 3). The D2D control unit 15 manages information indicating whether there is an interest in transmission of D2D discovery, reception/monitoring of D2D discovery, transmission of D2D communication, and/or reception/monitoring of D2D communication.

The radio transmission/reception unit 10 performs processing of the physical layer, such as modulation, demodulation, coding, and decoding. The radio transmission/reception unit 10 demultiplexes, demodulates, and decodes a signal received from the base station device 3 and outputs the information resulting from the decoding to the higher layer processing unit 14. The radio transmission/reception unit 10 generates a transmit signal by modulating and coding data and transmits the transmit signal to the base station device 3.

The RF unit 12 converts (down-converts) a signal received through the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal from the analog signal. The baseband unit 13 removes a portion corresponding to a cyclic prefix (CP) from the digital signal resulting from the conversion, performs fast Fourier transform (FFT) on the signal from which the CP has been removed, and extracts a signal in the frequency domain.

The baseband unit 13 performs inverse fast Fourier transform (IFFT) on data, generates an SC-FDMA symbol, attaches a CP to the generated SC-FDMA symbol, generates a digital signal in a baseband, and converts the digital signal in the baseband into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a carrier frequency signal, and transmits the result through the antenna unit 11. The RF unit 12 amplifies power, wire RF unit 12 may be capable of controlling transmit power. The RF unit 12 is also referred to as a transmit power control unit.

Figure 3:
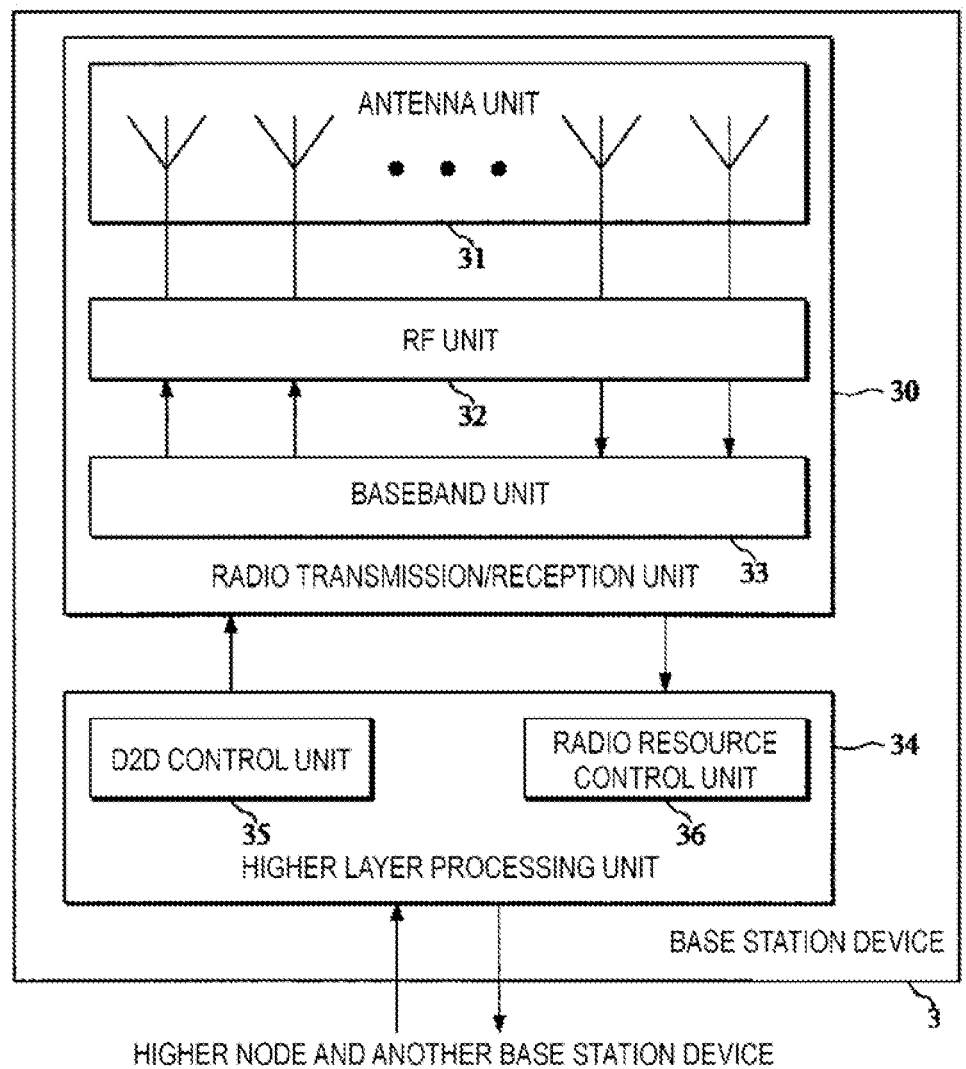
FIG. 3 is a schematic block diagram illustrating a configuration of a base station device 3 according to the present embodiment.

FIG. 3 is a schematic block diagram illustrating a configuration of the base station device 3 according to the present embodiment. As illustrated in FIG. 3, the base station device 3 is configured to include a radio transmission/reception unit 30 and a higher layer processing unit 34. The radio transmission/reception unit 30 is configured to include an antenna unit 31, an RF unit 32, and a baseband unit 33. The higher layer processing unit 34 is configured to include a D2D control unit 35 and a radio resource control unit 36. The radio transmission/reception unit 30 is also referred to as a transmission unit or a reception unit.

The higher layer processing unit 34 performs processing of the medium access control (MAC) layer, the packet data convergence protocol (PDCP) layer, the radio link control (RLC) layer, and the radio resource control (RRC) layer.

The D2D control unit 35 included in the higher layer processing unit 34 controls D2D discovery and/or D2D communication in the terminal device 1 communicating through a cellular link, on the basis of various pieces of configuration information/parameters managed by the radio resource control unit 36. The D2D control unit 35 may generate information associated with D2D to be transmitted to another base station device 3 and/or the terminal device 1.

The radio resource control unit 36 included in the higher layer processing unit 34 generates, or acquires from a higher node, downlink data (the transport block) arranged on a physical downlink channel, system information, an RRC message, a MAC control element (CE), and the like, and outputs a result of the generation or the acquirement to the radio transmission/reception unit 30. Furthermore, the radio resource control unit 36 manages various pieces of configuration information/parameters for each of the terminal devices 1. The radio resource control unit 36 may set various pieces of configuration information/parameters for each of the terminal devices 1 via a higher layer signal. In other words, the radio resource control unit 36 transmits/broadcasts information indicating various pieces of configuration information/parameters.

The function of the radio transmission/reception unit 30 is similar to that of the radio transmission/reception unit 10, and hence description thereof is omitted.

In the present embodiment, one or multiple serving cells are configured in a cellular link for the terminal device 1. A technology in which the terminal device 1 communicates with the base station device 3 via the multiple serving cells in the cellular link is referred to as cell aggregation or carrier aggregation. The serving cells are used for EUTRAN communication.

The multiple configured serving cells include one primary cell and one or multiple secondary cells. The primary cell is a serving cell in which an initial connection establishment procedure has been performed, a serving cell in which a connection re-establishment procedure has been started, or a cell indicated as the primary cell during a handover procedure. At a point of time when a radio resource control (RRC) connection is established, or later, the secondary cell may be configured.

In the case of cell aggregation, a time division duplex (TDD) scheme or a frequency division duplex (FDD) scheme may be applied to all the multiple serving cells. Cells to which the TDD scheme is applied and serving cells to which the FDD scheme is applied may be aggregated.

However, the function of the radio transmission/reception unit 10 varies among the terminal devices 1. In other words, the band (carrier, frequency) combination to which carrier aggregation is applicable varies among the terminal devices 1. For this reason, each of the terminal devices 1 transmits information/parameters RF-Parameters-r10 indicating the band combination to which carrier aggregation is applicable, to the base station device 3. Hereinafter, the band to which carrier aggregation is applicable is also referred to as a CA band. A band to which carrier aggregation is not applicable or carrier aggregation is applicable but has not been applied is also referred to as a non-CA band.

Figure 4:
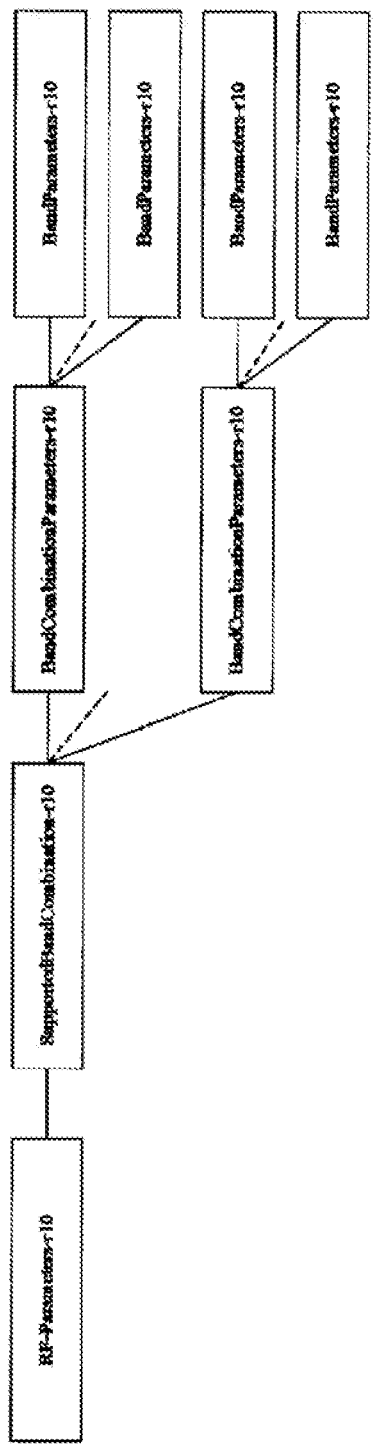
FIG. 4 is a diagram illustrating information/parameters included in RF-Pararaeters-r10 according to the present embodiment.

FIG. 4 is a diagram illustrating information/parameters included in RF-Parameters-r10) according to the present embodiment. RF-Parameters-r10 includes one SupportedBandCombination-r10. SupportedBandCombination-r10 includes one or multiple BandCombinationParameters-r10. SupportedBandCombination-r10 includes a supported CA band combination and a supported non-CA band.

BandCombinationParameters-r10 includes one or multiple BandParameters-r10. Each BandCombinationParameters-r10 indicates a supported CA band combination or a supported non-CA band. For example, when BandCombinationParameters-r10 includes multiple BandParameters-r10, communication to which carrier aggregation is applied with the CA band combination indicated by the multiple BandParameters-r10 is supported. When BandCombinationParameters-r10 includes one BandParameters-r10, communication in the band (non-CA band) indicated by the one BandParameters-r10 is supported.

Figure 5:
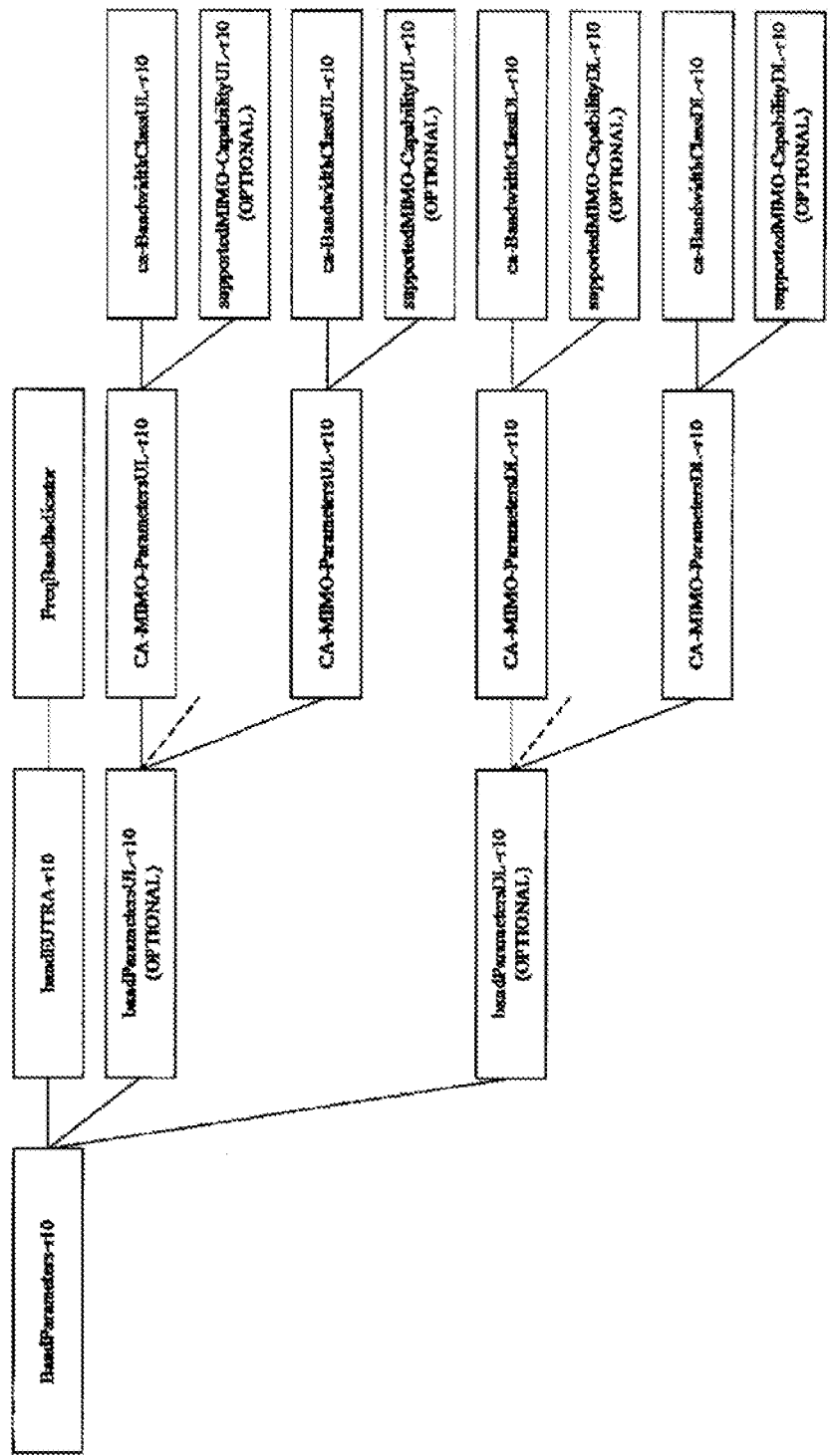
FIG. 5 is a diagram illustrating information/parameters included in BandParameters-r10 according to the present embodiment.

FIG. 5 is a diagram illustrating information/parameters included in BandParameters-r10 according to the present embodiment. BandParameters-r10 includes bandEUTRA-r10, bandParametersUL-r10, and bandParametersDL-10.

bandEUTRA-r10 includes FreqBandIndicator. FreqBandIndicator indicates a band. When the terminal device 1 is not capable of transmitting an uplink signal in the band indicated by FreqBandIndicator, BandParameters-r10 does not include bandParametersUL-r10. When the terminal device 1 is not capable of receiving a downlink signal in the band indicated by FreqBandIndicator, BandParameters-r10 does not include bandParametersDL-r10.

bandParametersUE-r10 includes one or multiple CA-MIMO-ParametersUL-r10. CA-MIMO-ParametersUL-r10 includes ca-BandwidthClassUL-r10 and supportedMIMO-CapabilityUL-r10. ca-BandwidthClassUL-r10 includes CA-BandwidthClass-r10.

supportedMIMO-CapabilityUL-r10 indicates the number of layers supported for spatial multiplexing in the uplink. When spatial multiplexing is not supported in the uplink, CA-MIMO-ParametersUL-r10 does not include supportedMIMO-Capability UL-r10.

bandParametersDL-r10 includes one or multiple CA-MIMO-ParametersDL-r10, CA-MIMO-ParametersDL-r10 includes ca-BandwidthClassDL-r10 and supportedMIMO-CapabilityDL-r10. ca-BandwidthClass DL-r10 includes CA-BandwidthClass-r10.

supportedMIMO-CapabilityDL-r10 indicates the number of layers supported for spatial multiplexing in the downlink. When spatial multiplexing is not supported in the downlink, CA-MIMO-ParametersDL-r10 does not include supportedMIMO-CapabilityUL-r10.

CA-BandwidthClass-r10 indicates the CA bandwidth class supported by the terminal device 1 in the uplink or the downlink. CA-BandwidthClassUL-r10 corresponds to the CA bandwidth class supported by the terminal device 1 in the uplink. CA-BandwidthClassDL-r10 corresponds to the CA bandwidth class supported by the terminal device 1 in the downlink. Each of the CA bandwidth classes is defined by the number of cells that can be simultaneously configured by the terminal device 1 in the band indicated by FreqBandIndicator, the total of the cell bandwidths simultaneously configured in the band indicated by FreqBandIndicator, and the like. For example, a CA bandwidth class a indicates that a single cell of 20 MHz or lower is configurable.

Figure 6:
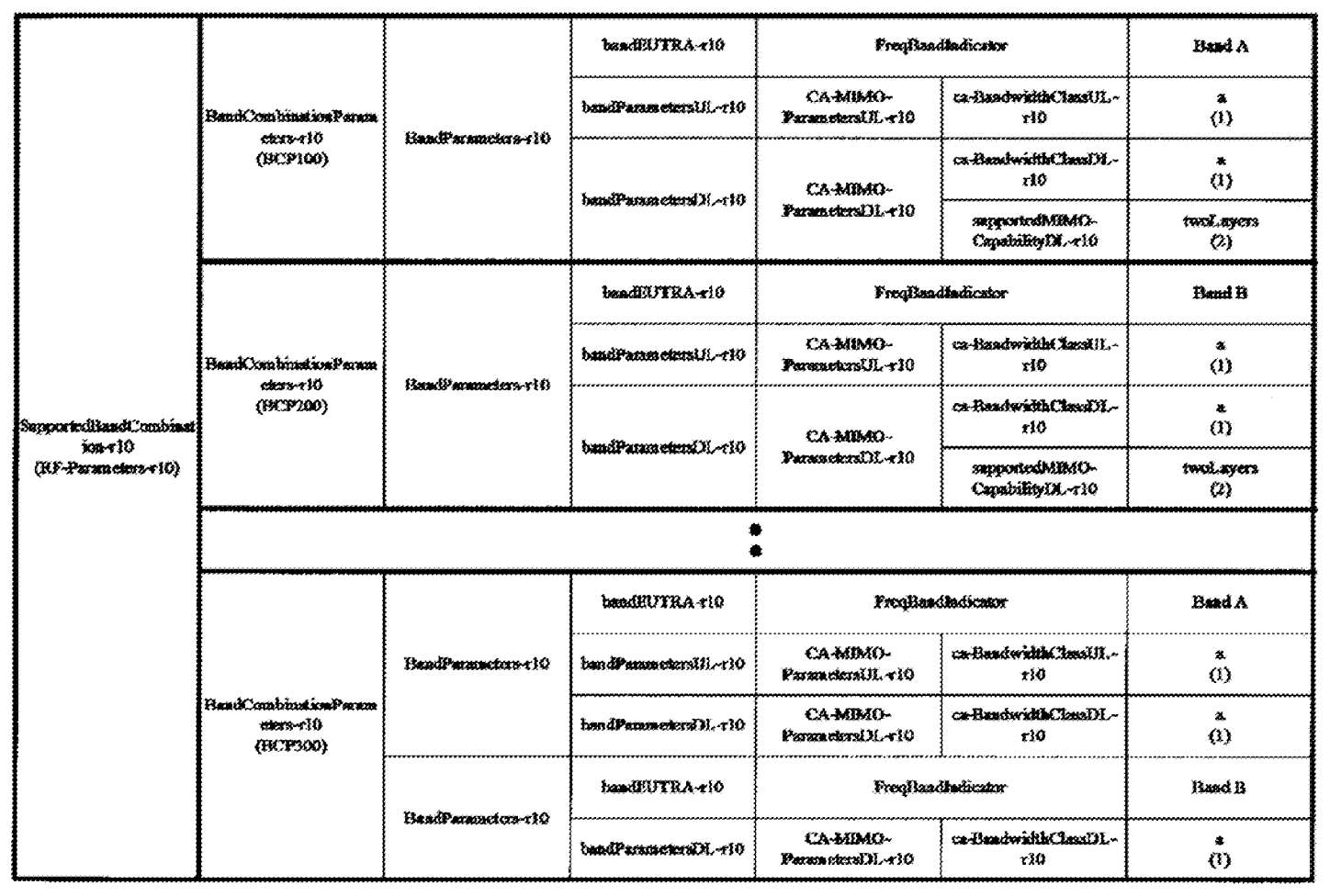

FIG. 6 is a diagram illustrating an example of RF-Pararaeters-r10 according to the present embodiment. For example, RF-Parameters-r10 includes one SupportedBandCombination-r10. As described above, SupportedBandCombination-r10 includes one or multiple BandCombinationParameters-r10. BandCombinationParameters-r10 includes one or multiple BandParameters-r10.

BandCombinationParameters-r10 of BCP100 indicates that uplink transmission is possible in a single cell in Band A and downlink transmission is possible in a single cell in Band A. In other words, BandCombinationParameters-r10 of BCP100 indicates that a single cell is supported in Band A. BandCombinationParameters-r10 of BCP100 indicates that two layers are supported for spatial multiplexing in the downlink in Band A. BandCombinationParameters-r10 of BCP100 indicates that spatial multiplexing is not supported in the uplink in Band A.

BandCombinationParameters-r10 of BCP300 indicates that uplink transmission is possible in a single cell in Band A, downlink transmission is possible in a single cell in Band A, and downlink transmission is possible in a single cell in Band B. In other words, BandCombinationParameters-r10 of BCP100 indicates that a combination of a single primary cell in Band A and a single secondary cell in Band B not involving the uplink is supported. BandCombinationParameters-r10 of BCP300 indicates that none of spatial multiplexing in the downlink in Band A, spatial multiplexing in the downlink in Band B, and spatial multiplexing in the uplink in Band A is supported.

A method of configuring a D2D resource according to the present embodiment will be described.

A resource reserved for D2D is referred to as a D2D resource. In an FDD cell, a downlink signal to be used for cellular communication is mapped to subframes of the downlink carrier, an uplink signal to be used for cellular communication is mapped to subframes of the uplink carrier, and a D2D signal to be used for D2D may be mapped to subframes of the uplink carrier. A carrier corresponding to a cell in the downlink is referred to as a downlink component carrier. A carrier corresponding to a cell in the uplink is referred to as an uplink component carrier. A TDD carrier is a downlink component carrier as well as an uplink component carrier.

In a TDD cell, a downlink signal to be used for cellular communication is mapped to downlink subframes and DwPTS, an uplink signal to be used for cellular communication is mapped to uplink subframes and UpPTS, and a D2D signal to be used for D2D may be mapped to uplink subframes.

An FDD sub frame including a D2D resource and a TDD uplink subframe including a D2D resource are each also referred to as a sidelink subframe.

The base station device 3 controls D2D resources reserved for D2D. The base station device 3 reserves some of the resources of the uplink carrier in the FDD cell, as D2D resources. The base station device 3 may reserve some of the resources of up link subframes and UpPTS in the TD D cell, as D2D resources.

The base station device 3 may transmit a higher layer signal including information indicating the set (pool) of D2D resources reserved for each of the cells, to the terminal device 1. The terminal device 1 sets a parameter D2D-ResourceConfig indicating the D2D resources reserved for each of the cells, on the basis of the higher layer signal received from the base station device 3. In other words, the base station device 3 may set the parameter D2D-ResourceConfig, indicating the D2D resources reserved for each of the cells, for the terminal device 1 via the higher layer signal.

The base station device 3 may set one or multiple parameters, indicating one or multiple sets of resources reserved for D2D, for the terminal device 1 via the higher layer signal.

Resource sets for D2D discovery type 1, D2D discovery type 2, D2D communication mode 1, and D2D communication mode 2 may be configured individually.

Resource sets for D2D physical channels may be configured individually.

Resource sets for D2D transmission and reception may be configured individually.

A resource set for PSSCH relating to D2D data transmission and a resource set for PSCCH relating to SCI transmission may be configured individually.

From the viewpoint of the terminal device 1, some of the above-described resource sets may be transparent. For example, the PSSCH in D2D communication mode 1 is scheduled in accordance with the SCI, which eliminates the need for the terminal device 1 to configure any resource set for receiving/monitoring the PSSCH in D2D communication mode 1.

3GPP has been considering the use of D2D for public safety (PS). The base station device 3 may notify the terminal device 1 of whether each set of D2D resources is a resource set for PS. The terminal device 1 may be authorized to perform D2D for PS via EUTRAN in other words, the terminal device 1 that has not been authorized to perform D2D for PS is not allowed to perform D2D with the resource set for PS.

The terminal device 1 may have a configuration for D2D configured in advance. When failing to detect any cell at the carrier/frequency authorized for D2D, the terminal device 1 may perform D2D communication/D2D discovery on the basis of the configuration configured in advance. Specifically, when being out-of-coverage of EUTRAN at the carrier/frequency authorized for D2D, the terminal device 1 may perform D2D communication/D2D discovery at the carrier/frequency authorized for D2D, on the basis of the configuration configured in advance. In other words, the terminal device 1 may perform D2D transmission and/or reception at the frequency/carrier for which no serving cell has been configured and at which no cell has been detected in a non-serving-cell.

When being out-of-coverage of EUTRAN at the carrier/frequency authorized for D2D, the terminal device 1 may simultaneously perform D2D communication/D2D discovery at the carrier/frequency authorized for D2D on the basis of the configuration configured in advance and cellular communication at a carrier/frequency not authorized for D2D.

The capability of the radio transmission/reception unit 10 of the terminal device 1 may be shared between the cellular link and the sidelink. For example, the capability of the radio transmission/reception unit 10 for the cellular link may be partially used for the sidelink. For example, when D2D is not being performed, the capability of the radio transmission/reception unit 10 for the sidelink may be used for the cellular link.

A first embodiment will be described below. The first embodiment may be applied to either or both of D2D communication and D2D discovery. The first embodiment may be applied only to sidelink transmission and cellular link transmission. The first embodiment may be applied only to sidelink reception and cellular link reception.

A possible combination of one or multiple bands in the cellular link and a band in the sidelink varies depending on the configuration of the radio transmission/reception unit 10 of the terminal device 1. For example, when two cells in Band A are simultaneously configured in the cellular link, a certain terminal device 1 is able to perform D2D in Band 8, but when two cells in Band A and a single cell in Band B are simultaneously configured in the cellular link, the terminal device 1 may not be able to perform D2D in Band B. In other words, when no cell for the cellular link is configured in Band B, the certain terminal device 1 is able to perform D2D in Band B, but when at least one cell for the cellular link is configured in Band B, the certain terminal device 1 may be unable to perform D2D in Band B.

To address this, in the first embodiment, information/parameter ProSeAssistance-r12 indicating the D2D configuration and/or interest of the terminal device 1 and information/parameter RF-Parameters-r12 indicating the D2D capability in corresponding BandCombinationParameter-r10 are transmitted together with information/parameter RF-parameters-r10.

Information/parameter ProSeAssistance-r12 may include some or all of the following information (1) to information (8). Information for D2D communication and information for D2D discovery may be separated from each other. In other words, information for D2D communication and information for D2D discovery may be distinguished from each other. Specifically, the following information (1) to information (8) may be defined for D2D communication. Furthermore, the following information (1) to information (8) may be defined for D2D discovery. Some of information (1) to information (8) may be brought together to define a single piece of information.

Information (1): information for requesting a resource for D2D transmission

Information (2): information indicating a band/frequency for which a resource for D2D transmission is configured.

Figure 7:
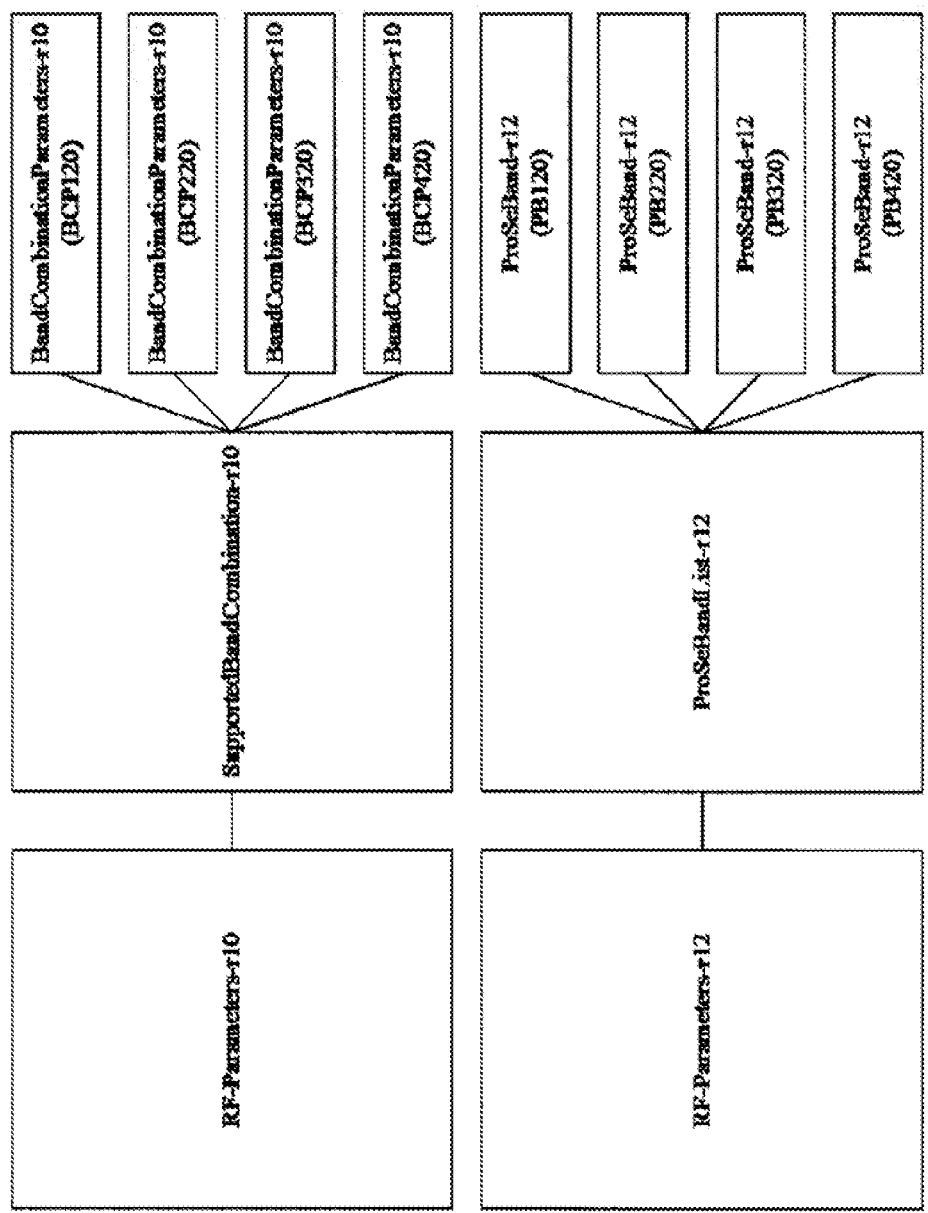
FIG. 7 is a diagram illustrating examples of RF-parameters-r10 and RF-Parameters-r12 according to a first embodiment.

Information (3): information indicating whether there is an interest in D2D transmission Information (4): information indicating a band/frequency for which there is an interest in D2D transmission Information (5): information for requesting a resource for D2D reception/monitoring Information (6): information indicating a band/frequency for which a resource for D2D reception/monitoring is configured Information (7): information indicating whether there is an interest in D2D reception/monitoring Information (8): information indicating a band/frequency for which there is an interest in D2D reception/monitoring FIG. 7 is a diagram illustrating examples of RF-parameters-r10 and RF-Parameters-r12 according to the first embodiment. In FIG. 7, RF-parameters-r10 includes SupportedBandCombination-r10, and SupportedBandCombination-r10 includes four BandCombinationParameter-r10 (BCP120, BCP220, BCP320, and BCP420). RF-parameters-r12 includes ProSeBandList-r12, and ProSeBandList-r12 includes ProSeBand-r12 (PB120, PB220, PB320, and PB420). Here, the number of ProSeBand-r12 included in ProSeBandList-r12 is the same as the number of BandCombinationParameter-r10 (four) included in SupportedBandCombination-r10. In other words, one ProSeBand-r12 corresponds to one BandCombinationParameter-r10. For example, the number assigned to ProSeBand-r12 is the same as the number assigned to corresponding BandCombinationParameter-r10. Specifically, PBX20 corresponds to BCPX20 (X=1, 2, 3, or 4).

Information/parameter ProSeBand-r12 may include some or all of the following information (9) to information (14). Information for D2D communication and information for D2D discovery may be separated from each other. In other words, information for D2D communication and information for D2D discovery may be distinguished from each other. Specifically, the following information (9) to information (14) may be defined for D2D communication. The following information (9) to information (14) may be defined for D2D discovery. Some of information (9) to information (14) may be brought together to define a single piece of information.

Figure 8:
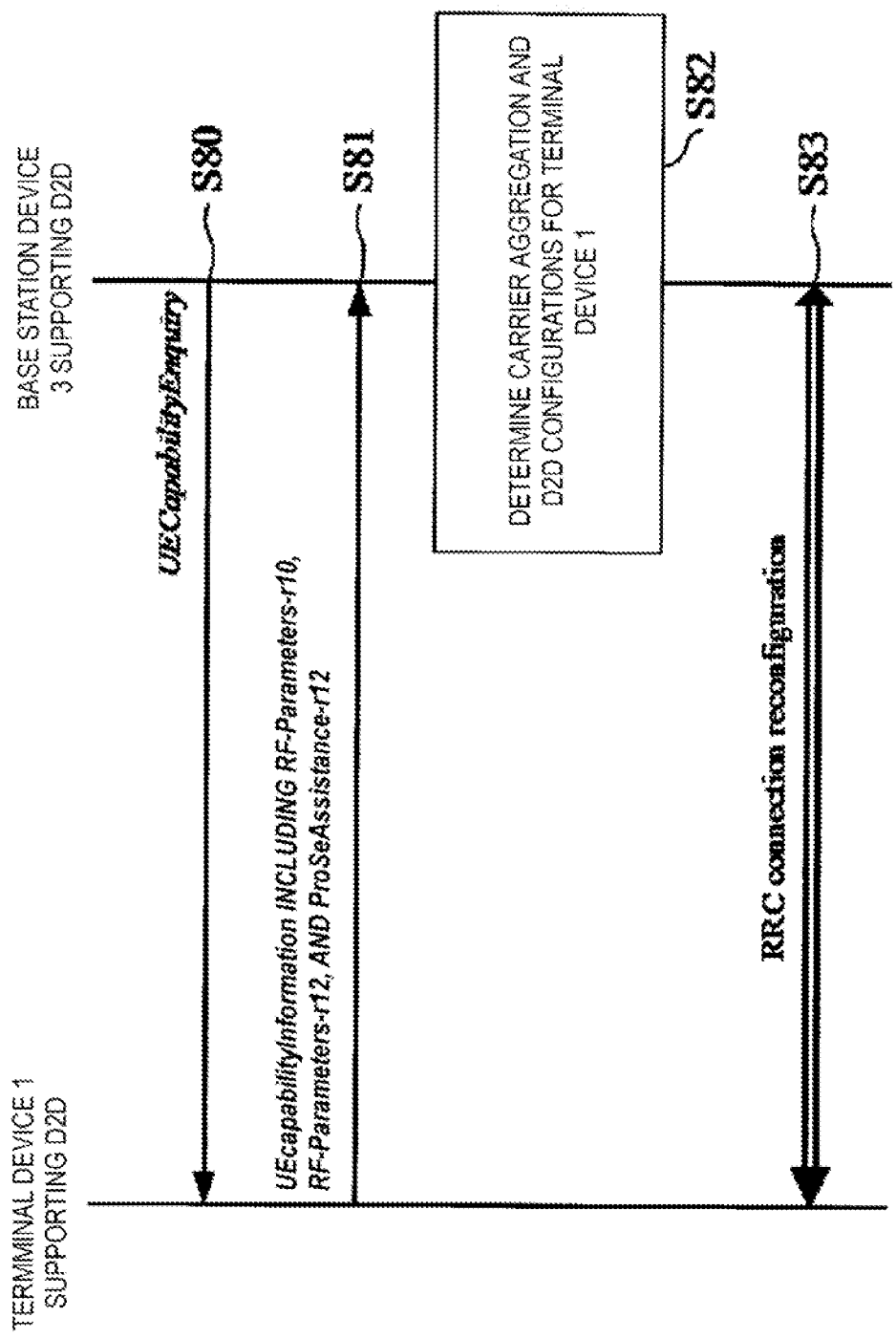
FIG. 8 is a sequence chart relating to transmission of UEcapabilityInformation according to the first embodiment.

Information (9): information indicating that D2D is possible when a band/the number of layers or a combination of bands/the number of layers indicated by corresponding BandCombinationParameter-r10 is configured for the cellular link Information (10): information indicating that D2D transmission is possible when a band/the number of layers or a combination of bands/the number of layers indicated by corresponding BandCombinationParameter-r10 is configured for the cellular link Information (11): information indicating that D2D reception is possible when a band/the number of layers or a combination of bands/the number of layers indicated by corresponding BandCombinationParanieter-r10 is configured for the cellular link Information (12): information indicating a band/frequency at which D2D is possible when a band/the number of layers or a combination of bands/the number of layers indicated by corresponding BandCombinationParameter-r10 is configured for the cellular link Information (13): information indicating a band/frequency at which D2D transmission is possible when a band/the number of layers or a combination of bands/the number of layers indicated by corresponding BandCombinationParameter-r10 is configured for the cellular link Information (14): information indicating a band/frequency at which D2D reception is possible when a band/the number of layers or a combination of bands/the number of layers indicated by corresponding BandCombinationParameter-r10 is configured for the cellular link FIG. 8 is a sequence chart relating to transmission of UEcapabilityInformation according to the first embodiment, UEcpabilityInformation may be an RRC message.

The base station device 3 supporting D2D transmits information/parameter UEcapabiHtyEnquiry for requesting transmission of information/parameter UEcapabilityInformation, to the terminal device 1 supporting either or both of D2D communication and D2D discovery (S80). The base station device supporting D2D is referred to simply as a base station device 3 below. The terminal device 1 supporting either or both of D2D communication and D2D discovery is simply referred to as a terminal device 1 below.

The terminal device 1 that has received information/parameter UECapabilityEnquiry transmits UEcapabilityInformation including ProSeAssistance-r12, RF-Parameters-r10, and RF-parameters-r12 to the base station device 3 (S81). On the basis of the received UEcapabilityInformation, the base station device 3 determines the configuration for carrier aggregation and/or spatial multiplexing, and D2D communication and/or D2D discovery for the terminal device 1 (S82). On the basis of the configuration determined in S82, the base station device 3 performs RRC connection reconfiguration for the terminal device 1 (S83).

These processes allow the base station device 3 to efficiently configure D2D and cells in the cellular link, on the basis of whether the terminal device 1 has an interest in D2D and of the capability of the radio transmission/reception unit 10 of the terminal device 1. Moreover, these processes allow the terminal device 1 to simultaneously perform D2D communication, D2D discovery and/or cellular communication efficiently.

A second embodiment will be described below. The second embodiment may be applied to either or both of D2D communication and D2D discovery. The second embodiment may be applied only to sidelink transmission and cellular link transmission. The second embodiment may be applied only to sidelink reception and cellular link reception.

When the combination of bands/the band indicated by BandCombinationParameter-r10 is configured in the cellular link, the terminal device 1 according to the second embodiment includes BandCombinationParameter-r10 in SupportedBandCombination-r10 or Supported BandCombination-Ext-r12 on the basis of whether sidelink transmission/reception is possible.

In other words, when sidelink transmission/reception is configured, the terminal device 1 according to the second embodiment includes BandCombinationParameter-r10 in SupportedBandCombination-r10 or SupportedBandCombinationExt-r12 on the basis of whether configuration of the combination of bands/the band/the number of layers indicated by BandCombinationParameter-r10 is possible in the cellular link.

When the combination of bands/the band/the number of layers indicated by BandCombinationParameter-r10 is configured in the cellular link, the terminal device 1 according to the second embodiment may include BandCombinationParameter-r10 in SupportedBandCombination-r10 or Supported BandCombinationExt-r12 on the basis of whether sidelink transmission/reception is possible in a band other than the band indicated by BandCombinationParameter-r10.

In other words, when sidelink transmission/reception is configured in a band other than the band indicated by BandCombinationParameter-r10, the terminal device 1 according to the second embodiment may include Band-CombinationParameter-r10 in Supported BandCombination-r10 or SupportedBandCombinationExt-r12 on the basis of whether configuration of the combination of bands/the band/the number of layers indicated by BandCombination-Parameter-r10 is possible in the cellular link.

Note that the combination of bands/the band/the number of layers indicated by BandCombinationParameter-r10 included in SupportedBandCombination-r10 does not coincide with the combination of bands/the band/the number of layers indicated by BandCombinationParameter-r10 included in SupportedBandCombinationExt-r12.

Figure 9:
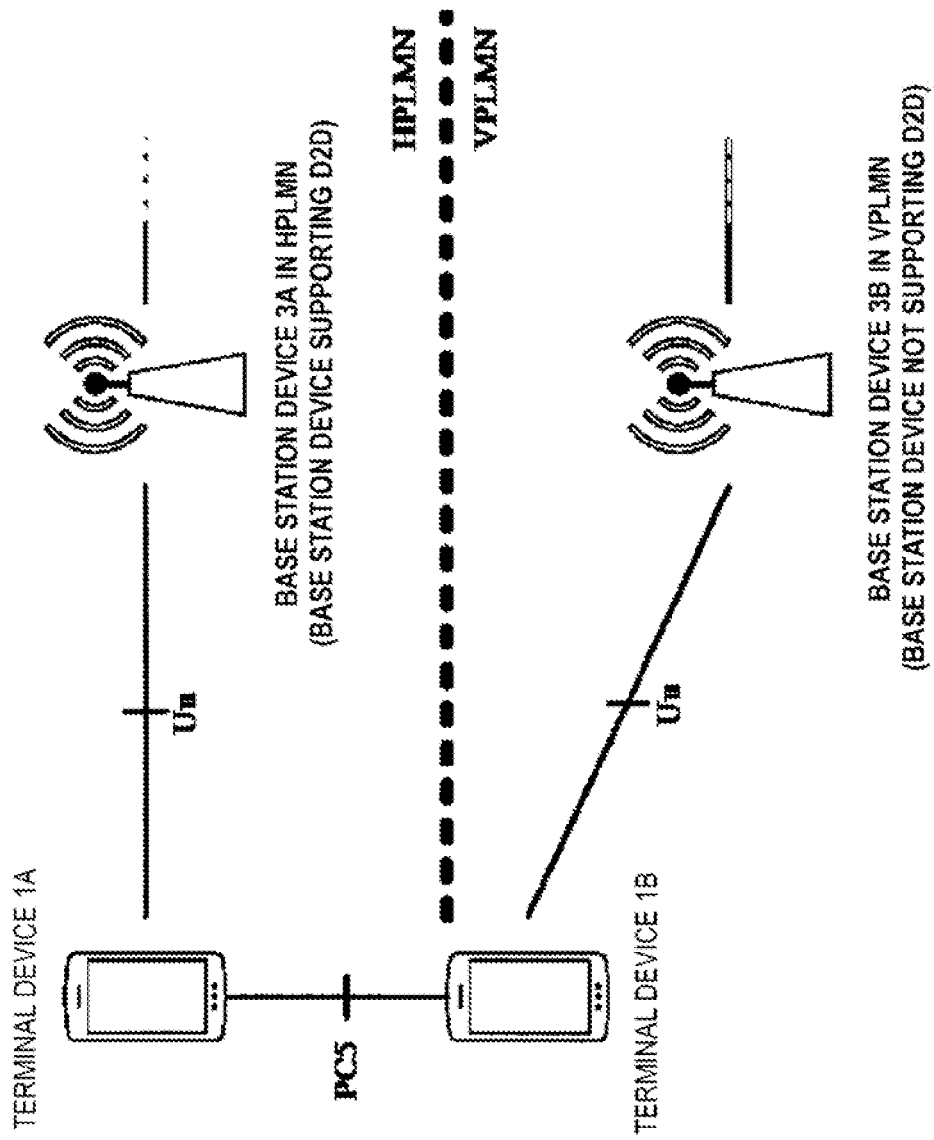
FIG. 9 illustrates a diagram in which a terminal device 1A linked to HPLMN and a terminal device 1B linked to VPLMN perform D2D according to a second embodiment.

FIG. 9 illustrates a drawing in which a terminal device 1A linked to a home public land mobile network (HPLMN) and a terminal device 1B linked to a visited public land mobile network (VPLMN) perform D2D according to the second embodiment. In FIG. 9, the HPLMN supports D2D, while the VPLMN does not support D2D. In FIG. 9, the terminal device 1A and the terminal device 1B perform D2D at the carrier/frequency authorized in the HPLMN.

In FIG. 9, the terminal device 1B roaming in the VPLMN performs D2D at the carrier/frequency authorized in the HPLMN. This means that, in FIG. 9, any CA band combination not supporting D2D is not configurable among the combinations of CA bands transmitted by the terminal device 1B using RF-parameters-r10. However, the VPLMN does not support D2D, which causes neither ProSeAssistance-r12 nor RF-parameters-r12 to be identified. Hence, a problem arises that art attempt is made to configure a CA band combination not supporting D2D, on the basis of RF-parameters-r10.

To address this, in the second embodiment, Supported-BandCombination-r10 may include a combination of CA bands/the number of layers supported simultaneously with D2D and a non-CA band/the number of layers supported simultaneously with D2D. In other words, SupportedBand-Combination-r10 may include the combination of CA bands/the number of layers supported even when D2D is being performed and the non-CA band/the number of layers supported even when D2D is being performed. In other words, SupportedBandCombination-r10 does not include the combination of CA bands/the number of layers not supported simultaneously with D2D and the non-CA band/the number of layers not supported simultaneously with D2D.

In the second embodiment, RF-Parameters-r12 additionally includes information/parameter SupportedBandCombinationExt-r12. SupportedBandCombinationExt-r12 may include the combination of CA bands/the number of layers supported only when D2D is not being performed. SupportedBandCombinationExt-r12 may include the non-CA band/the number of layers supported only when D2D is not being performed.

Figure 10:
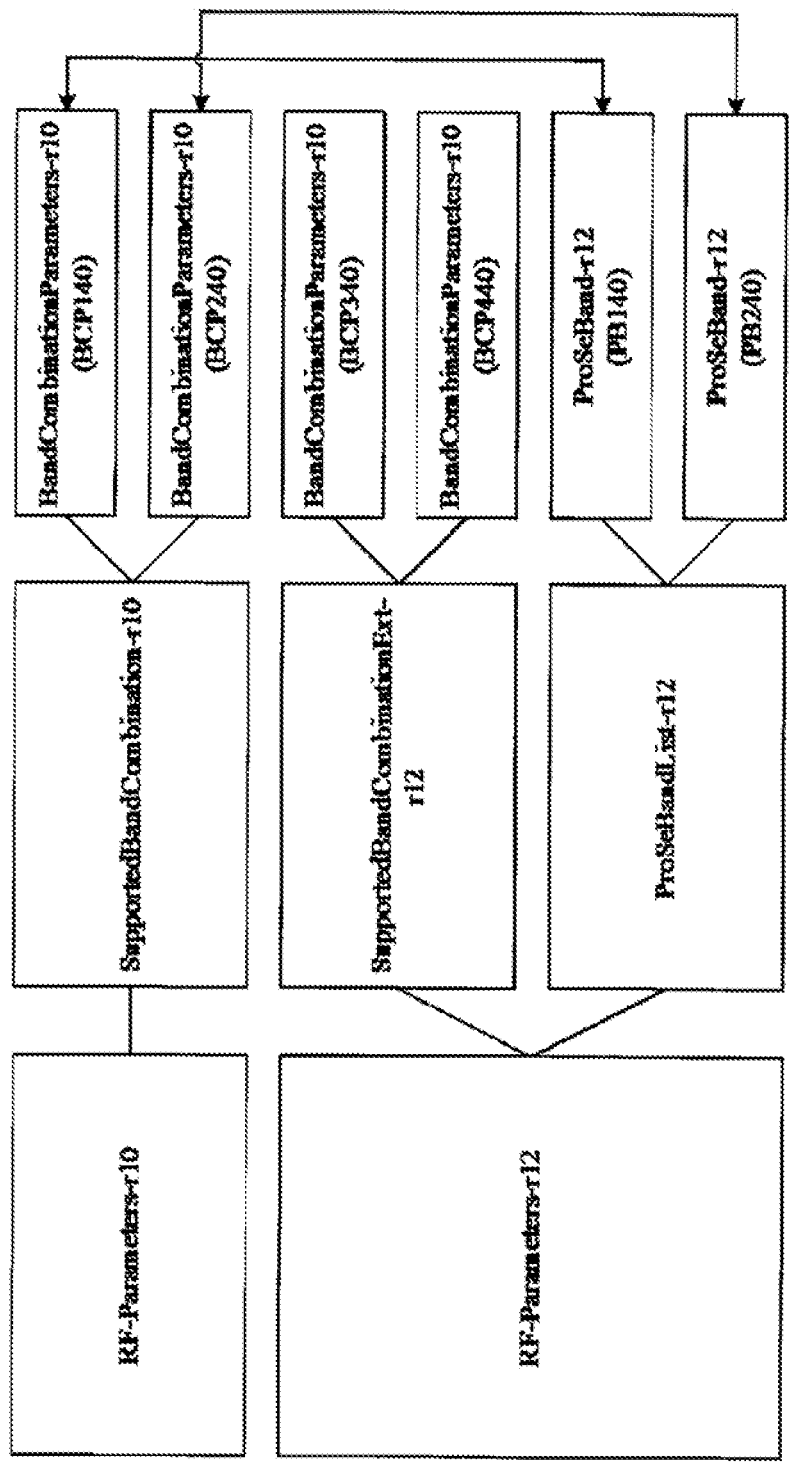
FIG. 10 is a diagram illustrating examples of RF-parameters-r10 and RF-Parameters-r12 according to the second embodiment.

FIG. 10 is a diagram illustrating examples of RF-parameters-r10 and RF-Parameters-r12 according to the second embodiment. In FIG. 10, RF-parameters-r10 includes SupportedBandCombination-r10, and SupportedBandCombination-r10 includes two BandCombinationParameter-r10 (BCP140 and BCP240). Here, each BandCombinationParameter-r10 (BCP140 and BCP240) indicates the combination of CA bands/the number of layers supported even when D2D is being performed or the non-CA band/the number of layers supported even when D2D is being performed. In other words, each BandCombinationParameter-r10 (BCP140 and BCP240) may indicate the combination of CA bands/the non-CA band/the number of layers supported for the cellular link (downlink and/or uplink) simultaneously with a D2D operation. In other words, each BandCombinationParameter-r10 (BCP140 and BCP240) may indicate the combination of CA bands/the non-CA band/the number of layers supported when D2D transmission/reception is configured.

In FIG. 10, RF-parameters-r12 includes SupportedBandCombinationExt-r12 and ProSeBandList-r12. In FIG. 10, SupportedBandCombinationExt-r12 includes two Band-Combination Parameter-r10 (PB340 and PB440). Here, each BandCombinationParameter-r10 (PB340 and PB440) indicates a CA band combination supported only when D2D is not being performed or a non-CA band supported only when D2D is not being performed. In other words, each BandCombinationParameter-r10 (PB340 and PB440) may indicate the combination of CA bands/the non-CA band/the number of layers not supported for the cellular link (downlink and/or uplink) simultaneously with a D2D operation. In other words, each BandCombinationParameter-r10 (PB340 and PB440) may indicate the combination of CA bands/the non-CA band/the number of layers supported when D2D transmission/reception is not configured.

In FIG. 10, ProSeBandList-r12 includes two ProSeBand-r12 (PB140 and PB240), the number of which is the same as the number of BandCombinationParameter-r10 included in SupportedBandCombination-r10. One ProSeBand-r12 corresponds to one BandCobinationParameter-r10. The number assigned to ProSeBand-r12 is the same as the number assigned to corresponding BandCobinationParameter-r10. Specifically, PBX40 corresponds to BCPX40 (X=1 or 2). As described above, ProSeBand-r12 may include some or all of information (9) to information (14).

The base station device 3 can determine that BandCombinationParameter-r10 included in SupportedBandCombinationExt-r12 implicitly indicates the combination of CA bands/the number of layers supported only when D2D is not being performed or the non-CA band/the number of layers supported only when D2D is not being performed, which eliminates the need for ProSeBand-r12 corresponding to BandCobinationParameter-r10 included in SupportedBandCombinationExt-r12 to be included in ProSeBandList-r12. This makes it possible to reduce the information amount of UEcapabilityInformation.

Figure 11:
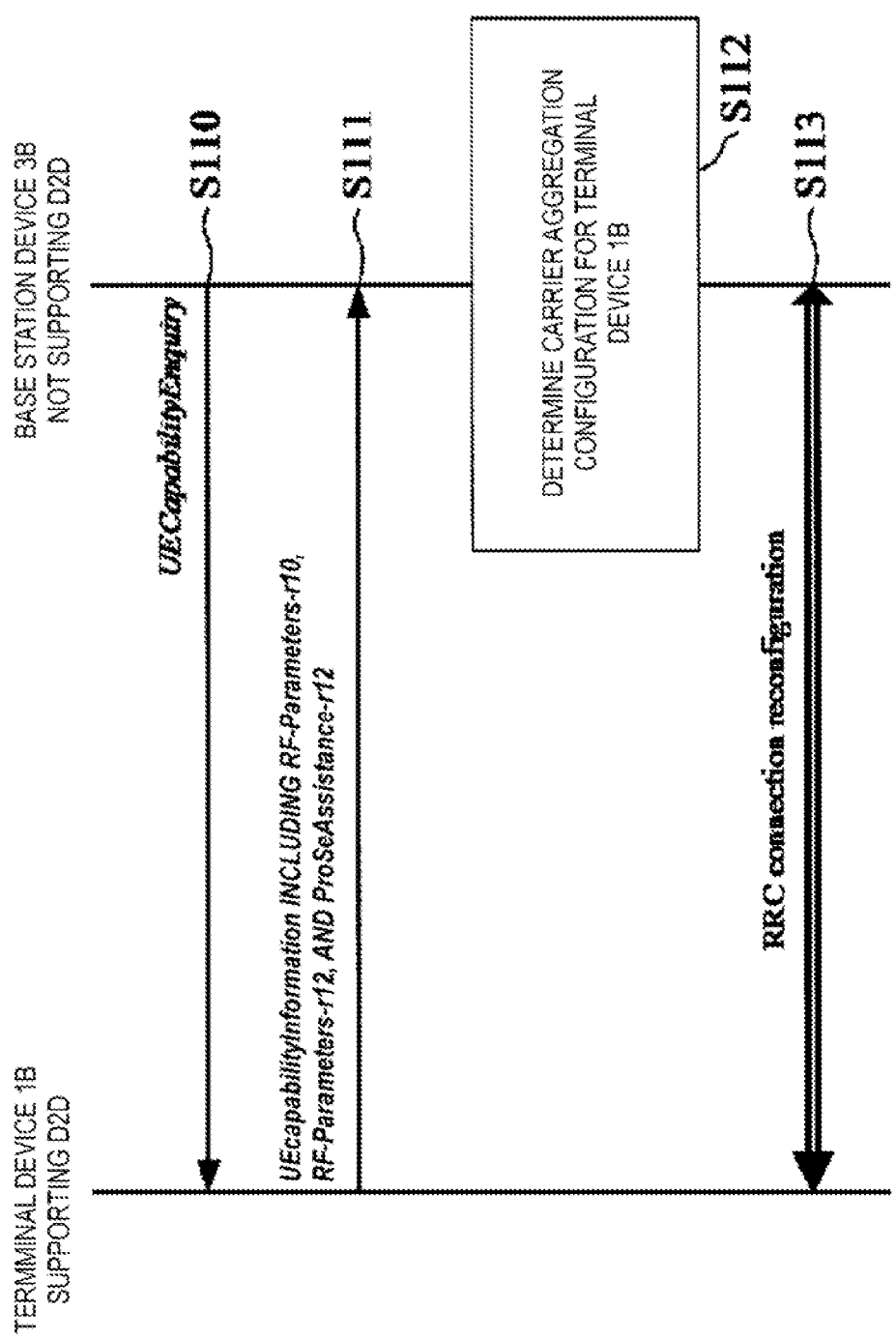
FIG. 11 is a sequence chart relating to transmission of UEcapabilityInformation according to the second embodiment.

FIG. 11 is a sequence chart relating to transmission of UEcapabilityInformation according to the second embodiment.

A base station device 3B not supporting D2D transmits information/parameter UECapabilityEnquitry for requesting transmission of information/parameter UEcapabilityInformation, to the terminal device 1B supporting either or both of D2D communication and D2D discovery (S110).

The terminal device 1 that has received information/parameter UECapabilityEnquitry transmits UEcapabilityInformation including ProSeAssistance-r12, RF-Parameters-r10, and RF-parameters-r12, to the base station device 3 (S111). On the basis of RF-Parameters-r10 included in received UEcapabilityInformation, the base station device 3 determines the configuration for carrier aggregation and/or spatial multiplexing for the terminal device 1 (S112). On the basis of the configuration determined in S112, the base station device 3 performs RRC connection reconfiguration for the terminal device 1 (S113).

The base station device 3B not supporting D2D ignores (unable to identify) SupportedBandCombinationExt-r12. Thus, the combination of CA bands/the number of layers supported only when D2D is not being performed and the non-CA band/the number of layers supported only when D2D is not being performed are not configured for the terminal device 1B supporting D2D. This allows the base station device 3B not supporting D2D to configure, on the basis of SupportedBandCombination-r10, the combination of CA bands/the number of layers supported even when D2D is being performed and the non-CA band/the number of layers supported even when D2D is being performed, for the terminal device 1B supporting D2D.

On the basis of SupportedBandCombinationExt-r12 (and/or ProSeBandList-r12), the base station device 3B supporting D2D may configure the combination of CA bands/the number of layers supported only when D2D is not being performed and the non-CA band/the number of layers supported only when D2D is not being performed, for the terminal device 1B supporting D2D but not performing D2D. On the basis of SupportedBandCombination-r10, the base station device 3B supporting D2D may configure the combination of CA bands/the number of layers supported even when D2D is being performed and the non-CA band/the number of layers supported even when D2D is being performed, for the terminal device 1B supporting D2D and performing D2D.

These processes allow the terminal device 1 to simultaneously perform D2D communication, D2D discovery and/or cellular communication efficiently. Moreover, these processes allow even the base station device 3 not supporting D2D to efficiently communicate with the terminal device 1 supporting D2D.

In the second embodiment, BandCombinationParameter-r10 indicating the combination of CA bands/the non-CA band/the number of layers supported when D2D is being performed in a certain band while not being supported when D2D is being performed in a band different from the certain band, may be included in SupportedBandCombinationExt-r12.

In this case, ProSeBand-r12 corresponding to BandCobinationParameter-r10 included in SupportedBandCombinationExt-r12 is needed. For this reason, in this case, ProSeBandList-r12 preferably includes ProSeBand-r12, the number of which is the same as the total of the number of BandCobinationParameter-r10 included in SupportedBandCombination-r10 and the number of BandCombinationParameter-r10 included in SupportedBandCombinationExt-r12, in ProSeBandList-r12.

Note that, in the first embodiment, BandCombinationParameter-r10 may be configured, SupportedBandCombination-r10 may be configured to indicate the combination of bands/the band/the number of layers supported even when D2D is being performed. In this case, in the first embodiment, when ProseBand-r12 includes information (12), information (13), and/or information (14) and when sidelink transmission/reception is not configured for the terminal device 1, the base station device 3 supporting D2D interprets the situation as the number of cells configurable for the cellular link increases by one in the band indicated by information (12), information (13), and/or information (14).

A third embodiment will be described below.

Conventionally, it is assumed that the maximum output power of the terminal device 1 in a cellular link is 23 dBm. However, in order to extend an area of D2D communication/D2D discovery for PS, the maximum output power may be increased to 31 dBm.

Power amplifiers included in the RF unit 12 of the terminal device 1 may support different bands. For example, a first power amplifier may support Band A. and a second power amplifier may support Band B and Band C. The maximum output power of the first power amplifier and the maximum output power of the second power amplifier may be different from each other. For example, the maximum output power of the first power amplifier may be 31 dBm, and the maximum output power of the second power amplifier may be 23 dBm. In this case, D2D communication/discovery for PS is preferably performed in Band A supported by the first power amplifier.

For example, it can be assumed that the requirement for a filter is satisfied by restricting the output power of the power amplifier having the maximum output power of 31 dBm, to 23 dBm. Therefore, the terminal device 1 may restrict the output power of the power amplifiers depending on bands.

The terminal device 1 according to the third embodiment transmits information indicating a power class of the terminal device 1 to the base station device 3. The information indicating the power class of the terminal device 1 includes information indicating the power class corresponding to each band, and/or information indicating the power class corresponding to a combination of aggregated bands. The information indicating the power class of the terminal device 1 may correspond to a band/a combination of bands indicated by RF-parameters-r10 and/or RF-parameters-r12. FIG. 12 is a table showing an example of a correspondence between a band/a combination of bands and a power class according to the third embodiment.

For example, the power class corresponding to each band may define the maximum output power supported in the band. The information indicating the power class corresponding to each band may indicate that transmission corresponding to the power class indicated by the information has been successfully tested in the band. The power class corresponding to each band may define the maximum output power which has been successfully tested in the band to confirm that the requirement or the like specified in the specifications of EUTRAN or the like is satisfied.

For example, the power class corresponding to each combination of aggregated bands may define the maximum output power supported in the combination of aggregated bands. The information indicating the power class corresponding to each combination of aggregated bands may indicate that transmission corresponding to the power class indicated by the information has been successfully tested in the combination of aggregated bands. The power class corresponding to each combination of aggregated bands may define the maximum output power which has been successfully tested in the combination of aggregated bands to confirm that the requirement or the like specified in the specifications of EUTRAN or the like is satisfied.

For example, the terminal device 1 may transmit information indicating the power class corresponding to the maximum output power of 31 dBm as the power class corresponding to the band supporting D2D communication/discovery. The terminal device 1 may transmit information indicating the power class corresponding to the maximum output power of 23 dBm as the power class corresponding to the band supporting D2D communication/discovery. The terminal device 1 may transmit information indicating the power class corresponding to the maximum output power of 31 dBm as the power class corresponding to the band not supporting D2D communication/discovery. The terminal device 1 may transmit information indicating the power class corresponding to the maximum output power of 23 dBm as the power class corresponding to the band not supporting D2D communication/discovery.

The aggregated bands include a band to which a serving cell to be configured belongs. The aggregated bands include a band to which a non-serving cell belongs, transmission in a sidelink being configured for the non-serving cell. The non-serving cell is a cell other than the serving cell.

The base station device 3 according to the third embodiment may receive the information indicating the power class of the terminal device 1 from the terminal device 1, and perform transmit power control and scheduling on the basis of the information.

The maximum output power PPowerClass defined by the power class corresponding to the band to which the serving cell c belongs may be power without taking tolerance into account.

The maximum output power PPowerClass defined by the power class corresponding to the band to which the serving cell c belongs may correspond to any transmission bandwidth within the channel bandwidth of the band.

The maximum output power PPowerClass defined by the power class corresponding to the combination of aggregated bands may be power without taking tolerance into account.

The maximum output power PPowerClass defined by the power class corresponding to the combination of aggregated bands may correspond to any transmission bandwidth within the channel bandwidth of the aggregated bands.

The terminal device 1 according to the third embodiment determines transmit power in the uplink of the serving cell c and/or in the sidelink, on the basis of the maximum output power PCMAX, C for the serving cell c and the total maximum output power PCMAX. In uplink carrier aggregation, the maximum output power PCMAX, C for the serving cell c is based on the maximum output power PPowerClass defined by the power class corresponding to the band to which the serving cell c belongs, and the total maximum output power PCMAX is based on the maximum output power PPowerClass defined by the power class corresponding to the combination of aggregated bands.

The transmit power of the terminal device 1 in a single serving cell c does not exceed the maximum output power PCMAX, C configured for the serving cell c. The total transmit power of the terminal device 1 does not exceed the configured total maximum output power PCMAX.

Hereinafter, the definition of the maximum output power PCMAX, C for the serving cell c will be described in detail.

The maximum output power PCMAX, C for the serving cell c is configured within a range indicated by Expression (1). Specifically, the maximum output power PCMAX, C is configured so as to exceed PCMAX_L, c. Specifically, the maximum output power PCMAX, C is configured so as not to exceed PCMAX_H, c. PCMAX_L, c in Expression (1) is defined by Expression (2). PCMAX_H, c in Expression (1) is defined by Expression (3).

[Expression 1]

$$P_{CMAX\_L,c} \leq P_{CMAX,c} \leq P_{CMAX\_H,c} \quad (1)$$

[Expression 2]

$$P_{CMAX\_L,c} = \text{MIN}\{P_{EMAX,c} - \Delta T_{C,c}, P_{PowerClass} - \text{MAX}(MPR_c + A - MPR_c + \Delta T_{IR,c} + \Delta T_{C,c}, P - MPR_c)\} \quad (2)$$

[Expression 3]

$$P_{CMAX\_H,c} = \text{MIN}\{P_{CMAX,c}, P_{PowerClass}\} \quad (3)$$

Here, PPowerClass in Expression (2) and Expression (3) indicates the maximum output power defined by the power class corresponding to the hand to which the serving cell c belongs.

PEMAX, c is a value given by configured P-Max (a parameter for configuring P-Max) for the serving cell c. P-Max may be given by an information element of P-MAX (P-MAX Information Element). For example, any value (integer value) from −30 to 33 may be given as P-Max.

In other words, P-Max may be used to limit the transmit power in the uplink or sidelink of the terminal device 1 at a carrier frequency (it is also referred to as "to limit the UE's uplink or sidelink transmission power on a carrier frequency"). P-Max may be used to provide a cell selection criterion. For example, P-Max may be used for computing a parameter (also referred to as a parameter Pcompensation) used to determine whether the cell selection criterion is satisfied. In other words, the parameter P-Max corresponds to the parameter PEMAX, c.

The base station device 3 may transmit information indicating P-Max to the terminal device 1. P-Max for the sidelink in the non-serving cell may be configured in advance. P-Max for the sidelink in the non-serving cell may be the same as the value of the power class PPowerClass corresponding to the band to which the non-serving cell belongs.

A maximum power reduction MPRc indicates the allowed maximum output power reduction (the amount of reduction) for the maximum output power for the serving cell c. Here, the MPRc depends on a higher order modulation, such as a QPSK modulation scheme or 16QAM modulation scheme. MPRc also depends on transmission of bandwidth configuration (resource block), in other words, the MPRC indicates the maximum output power of the terminal for modulation and/or channel bandwidth.

An additional maximum power reduction A-MPRc indicates the additional maximum power reduction (the amount of reduction) for the serving cell c. The terminal device 1 is permitted to apply A-MPRc by a signal for requesting additional spectrum emission by a network.

ΔTIB, c indicates the additional tolerance for the serving cell c. The value of ΔTIB, c is defined for each combination of bands. ΔTIB, c is defined for each band in the combination of bands. When ΔTIB, c is not defined, the value of ΔTIB, c is 0. FIG. 13 is a table showing an example of ΔTIB, c according to the third embodiment.

DTC, c indicates the additional tolerance for transmission bandwidth at an edge of channel bandwidth in a certain band. DTC, c is 1.5 dB or 0 dB, for example.

P-MPRc indicates the allowed maximum output power reduction (the amount of reduction) for ensuring the compliance with applicable electromagnetic energy absorption requirements or the like.

MIN is a function of returning the minimum value of elements in the parenthesis. MAX is a function of returning the maximum value of elements in the parenthesis.

The measured maximum output power PUMAX, c for the serving cell c needs to be within a range indicated by Expression (4).

[Expression 4]

$$P_{CMAX\_L,c} - \text{MAX}\{T_L T_c(P_{CMAX\_L,c})\} \leq P_{UMAX,c} \leq P_{CMAX\_H,c} + T_c(P_{CMAX\_H,c}) \quad (4)$$

Each of TL and TH is tolerance corresponding to a hand and a power class. FIG. 14 is a fable showing examples of tolerance (TL, TH) according to the third embodiment.

Tc (PCMAX, C) is tolerance corresponding to PCMAX_L,c or PCMAX_H, c. Tc (PCMAX, C) is based on the input values of PCMAX_L, c or PCMAX_H, c. FIG. 15 is a table showing an example of tolerance Tc (PCMAX_X, c) according to the third embodiment.

Hereinafter, the definition of the total maximum output power PCMAX for the terminal device 1 will be described in detail.

The total maximum output power PCMAX in the uplink and/or the sidelink is configured to be within a range indicated by Expression (5). Specifically, the maximum output power PCMAX is configured so as to exceed PCMAX_L. Specifically, the maximum output power PCMAX is configured so as not to exceed PCMAX_H.

[Expression 5]

$$P_{CMAX\_L} \leq P_{CMAX} \leq P_{CMAX\_H} \qquad (5)$$

For the inter-band carrier aggregation in the uplink, in which a single serving cell associated with the uplink is present for each operating band, $P_{CMAX\_L}$ in Expression (5) is defined by Expression (6), and $P_{CMAX\_H}$ in Expression (5) is defined by Expression (7).

[Expression 6]

$$P_{CMAX\_L} = MIN \{10 \quad \log_c \quad \Sigma MIN[P_{MAX,c}/(\Delta t_{C,c}), p_{PowerClass}/(mpr_c \cdot ampr_c \cdot \Delta t_{C,c} \Delta t_{C,c}), P_{PowerClass}/pmpr_c], P_{PowerClass}\} \qquad (6)$$

[Expression 7]

$$P_{CMAX\_H} = MIN\{10 \log_{10} \Sigma P_{CMAX,c}, P_{PowerClass}\} \qquad (7)$$

For the infra-band contiguous carrier aggregation in the uplink, $P_{CMAX\_L}$ in Expression (5) is defined by Expression (8), and $P_{CMAX\_H}$ in Expression (5) is defined by Expression (9).

[Expression 8]

$$P_{CMAX\_L} = MIN\{10 \log_{10} \Sigma P_{CMAX,c} - \Delta T_C, P_{PowerClass} - MAX(MPR + A - MPR + \Delta T_{IB,c} + \Delta T_C, P - MPR)\} \qquad (8)$$

[Expression 9]

$$P_{CMAX\_H} = MIN\{10 \log_{10} \Sigma P_{CMAX,c}, P_{PowerClass}\} \qquad (9)$$

Here, pPowerClass in Expression (6), Expression (7), Expression (8), and Expression (9) is a true value (linear value) of the maximum output power PPowerClass defined by the power class corresponding to the combination of aggregated bands.

pEMAX, c is a true value of PEMAX, c mprc is a true value of MPRc. amprc is a true value of A-MPRc. DtIB, c is a true value of DTIB, c. DtC, c is a true value of DTC, c pmprc is a true value of P-MPRc.

The measured total maximum output power PUMAX for all serving cells/non-serving cells in the uplink and the sidelink needs to be within a range indicated by Expression (10).

[Expression 10]

$$P_{CMAX\_L} - T(P_{CMAX\_L}) \leq P_{UMAX} \leq P_{CMAX\_H} + T(P_{CMAX\_H}) \qquad (10)$$

$T(P_{CMAX})$ is tolerance corresponding to $P_{CMAX\_L}$ or $P_{CMAX\_H} T(P_{CMAX})$ is based on the input value of $P_{CMAX\_L}$ or $P_{CMAX\_H}$. FIG. 16 is a table showing art example of tolerance T $(P_{CMAX\_X})$ according to the third embodiment.

The total maximum output power $P_{UMAX}$ to be measured is given by Expression (11). $P_{UMAX, c}$ is a true value of the maximum output power $P_{UMAX, c}$ measured in the cell c.

[Expression 11]

$$P_{UMAX} = 10 \log_{10} \Sigma P_{UMAX,c} \qquad (11)$$

The transmit power $P_{PUSCH, c}$ (i) for the transmission of PUSGH in subframe i in the serving cell c may be controlled by one or multiple parameters. The transmit power $P_{PUSCH, c}$ (i) for the transmission of PUSCH in subframe i in the serving cell c is given by Expression (12) so as not to exceed $P_{CMAX, c}$ (i) for the serving cell c.

[Expression 12]

$$P_{PUSCH,c}(f) = MIN\{P_{CMAX,c}(i), X\}[dbm] \qquad (12)$$

The transmit power $P_{PUCCH, c}$ (i) for the transmission of PUCCH in subframe i in the serving cell c may be controlled by one or multiple parameters. The transmit power $P_{PUCCH, c}$ (i) for the transmission of PUCCH in subframe i in the serving cell c is given by Expression (13) so as not to exceed $P_{CMAX, c}$ (i) for the serving cell c.

[Expression 13]

$$P_{PUCCH,c}(i) = MIN\{P_{CMAX,c}(i), Y\}[dBm] \qquad (13)$$

The transmit power $P_{SL, c}$ (i) for the transmission of a sidelink physical channel in subframe i in the serving cell c or the non-serving cell c may be controlled by one or multiple parameters. The transmit power $P_{SL}$ (i) for the transmission of the sidelink physical channel in subframe i in the serving cell c or the non-serving cell c is given by Expression (15) so as not to exceed $P_{CMAX, c}$ (i) for the serving cell c or the non-serving cell c.

[Expression 14]

$$P_{SL}(i) = MIN\{P_{CMAX,c}(i), Z\}[dBm] \qquad (14)$$

For example, in subframe i, when the sum of the transmit power for the transmission of PUCCH, the transmit power for the transmission of PUSCH, and the transmit power for the transmission of the sidelink physical channel exceeds the total maximum output power $P_{CMAX}$ (i), the terminal device 1 decreases $P_{SL, c}$ (i) so that the state indicated by Expression (15) may be satisfied, $P_{SL, c}$ (i) is a true value of $P_{SL, c}$ (i). $P_{PUSCH, c}$ (i) is a true value of $P_{PUSCH, c}$(i) $P_{PUCCH, c}$ (i) is a true value of $P_{PUCCH, c}$ (i). The terminal device 1 controls the value of v (i) within a range from 0 to 1, in order to decrease $P_{SL, c}$ (i).

[Expression 15]

$$v(i)*P_{SL}(i) \leq (P_{CMAX}(i) - P_{PUCCH,c}(i) - \Sigma P_{PUSCH,c}(i)) \qquad (15)$$

For example, in subframe i, when the sum of the transmit power for the transmission of PUCCH and the transmit power for the transmission of PUSCH exceeds the total maximum output power $P_{CMAX}$ (i), the terminal device 1 decreases $P_{pusch, c}$ (i) so that the state indicated by Expression (16) may be satisfied. The terminal device 1 controls the value of $w_c$ (i) within a range from 0 to 1, in order to decrease $P_{PUSCH, c}$ (i). The values of $w_c$ (i) may differ between cells. However, except for $w_c$ (i) set to 0, all the values of $w_c$ (i) are the same.

[Expression 16]

$$\Sigma w_c(i)*P_{PUSCH,c}(i) \leq (P_{CMAX}(i) - P_{PUCCH,c}(i)) \qquad (16)$$

(1) The terminal device 1 according to the present embodiment includes a power control unit determining transmit power in a serving cell c on the basis of maximum output power $P_{CMAX, c}$ for the serving cell c and total maximum output power $P_{CMAX}$. In such a terminal device 1, with respect to uplink carrier aggregation, the maximum output power $P_{CMAX, c}$ for the serving cell c is based on maximum output power $P_{PowerClass}$ defined by a power class corresponding to a band to which the serving cell c belongs, and the total maximum output power $P_{CMAX}$ is based on maximum output power $P_{PowerClass}$ defined by a power class corresponding to a combination of aggregated bands.

(2) The terminal device 1 according to the present embodiment includes a power control unit determining transmit power in a serving cell c on the basis of the maximum output power $P_{CMAX,\,c}$ for the serving cell c and the total maximum output power $P_{CMAX}$.

(3) The above-described power control unit determines, with respect to uplink career aggregation, a power class corresponding to a combination of aggregated bands on the basis of the combination of aggregated bands, and configures total maximum output power $P_{CMAX}$ on the basis of the maximum output power $P_{PowerClass}$ defined by the power class corresponding to the combination of aggregated bands.

(4) The base station device 3 according to the present embodiment includes a reception unit receiving information indicating a power class corresponding to a band and information indicating a power class corresponding to a combination of aggregated bands from a terminal device. In such base station device 3, transmit power of the terminal device in a serving cell c is determined on the basis of maximum output power $P_{CMAX,\,c}$ for the serving cell c and total maximum output power $P_{CMAX}$, and, with respect to uplink carrier aggregation, the maximum output power $P_{CMAX,\,c}$ for the serving cell c is based on maximum output power $P_{PowerClass}$ defined by the power class corresponding to the band to which the serving cell c belongs, and the total maximum output power $P_{CMAX}$ is based on maximum output power $P_{PowerClass}$ defined by the power class corresponding to the combination of aggregated bands.

This configuration allows the base station device 3 to efficiently control the transmit power of the terminal device 1. This configuration also allows the terminal device 1 and the base station device 3 to efficiently communicate with each other.

A program running on each of the base station device 3 and the terminal device 1 according to the present invention may be a program that controls a central processing unit (CPU) and the like (a program for causing a computer to operate) in such a manner as to realize the functions according to the above-described embodiments of the present invention. The information handled in these devices is temporarily stored in a random access memory (RAM) while being processed. Thereafter, the information is stored in various types of read only memory (ROM) such as a flash ROM or a hard disk drive (HDD) and when necessary, is read by the CPU to be modified or rewritten.

Moreover, the terminal device 1 and the base station device 3 according to the above-described embodiments may be partially realized by the computer. This configuration may be realized by recording a program for realizing such control functions on a computer-readable recording medium and causing a computer system to read the program recorded on the recording medium for execution.

Moreover, the "computer system" here is defined as a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication Sine that is used to transmit the program over a network such as the Internet or over a communication line such as a telephone line, and a medium that retains, in that case, the program for a certain period of time, such as a volatile memory within the computer system which functions as a server or a client. Furthermore, the program may be configured to realize some of the functions described above, and additionally may be configured to be capable of realizing the functions described above in combination with a program already recorded in the computer system.

Furthermore, the base station device 3 according to the above-described embodiments can be realized as an aggregation (a device group) constituted of multiple devices. Devices constituting the device group may be each equipped with some or all portions of each function or each functional block of the base station device 3 according to the above-described embodiments. It is only required that the device group itself include general functions or general functional blocks of the base station device 3. Furthermore, the terminal device 1 according to the above-described embodiments can also communicate with the base station device as the aggregation.

Furthermore, the base station device 3 according to the above-described embodiments may be an evolved universal terrestrial radio access network (EUTRAN), furthermore, the base station device 3 according to the above-described embodiments may have some or all portions of a function of a node higher than an eNodeB.

Furthermore, some or all portions of each of the terminal device 1 and the base station device 3 according to the above-described embodiments may be realized as an LSI that is a typical integrated circuit or may be realized as a chip set. The functional blocks of each of the terminal device 1 and the base station device 3 may be individually realized as a chip, or some or all of the functional blocks may be integrated into a chip. Furthermore, a circuit integration technique is not limited to the LSI, and may be realized with a dedicated circuit or a general-purpose processor. Furthermore, if with advances in semiconductor technology, a circuit integration technology with which an LSI is replaced appears, it is also possible to use an integrated circuit based on the technology.

Furthermore, according to the above-described embodiments, the terminal device is described as one example of a communication device, but the present invention is not limited to this, and can be applied to a fixed-type electronic apparatus installed indoors or outdoors, or a stationary-type or movable type electronic apparatus, for example, a terminal device or a communication device, such as an audio-video (AV) apparatus, a kitchen apparatus, a cleaning or washing machine, an air-conditioning apparatus, office equipment, a vending machine, an automobile, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

DESCRIPTION OF REFERENCE NUMERALS 1 (1A, 1B, 1C) Terminal device
3 (3A, 3B) Base Station device
10 Radio transmission/reception unit
11 Antenna unit
12 RF unit
13 Baseband unit
14 Higher layer processing unit
15 D2D control unit
16 Radio resource control unit
30 Radio transmission/reception unit
31 Antenna unit
32 RF unit
33 Baseband unit
34 Higher layer processing unit
35 D2D control unit
36 Radio resource control unit

The invention claimed is:

1. A terminal device comprising:
reception circuitry configured to and/or programmed to receive information which includes a parameter P-Max, the P-Max being used to limit the uplink transmission power on a first serving cell,
transmission circuitry configured to and/or programmed to transmit information which indicates at least two power classes, the at least two power classes corresponding to different bands, and
power control circuitry configured to and/or programmed to set transmit power for a transmission in the first serving cell based on at least first maximum output power $P_{CMAX,c}$ for the first serving cell, the first maximum output power $P_{CMAX,c}$ being within a range based on at least (i) second maximum output power $P_{PowerClass}$, (ii) the parameter P-Max for the first serving cell and (iii) a first tolerance, wherein
the second maximum output power $P_{PowerClass}$ is defined by one of the at least two power class, the one of the at least two power class corresponding to a band to which the first serving cell belongs.

2. A base station device comprising:
transmission circuitry configured to and/or programmed to transmit information which includes a parameter P-Max, the P-Max being used to limit the uplink transmission power on a first serving cell, and
reception circuitry configured to and/or programmed to receive, from a terminal device, information which indicates at least two power classes, the at least two power classes corresponding to different bands
transmit power for a transmission in the first serving cell by the terminal device is set based on at least first maximum output power $P_{CMAX,c}$ for the first serving cell, the first maximum output power $P_{CMAX,c}$ being within a range based on at least (i) second maximum output power $P_{PowerClass}$ which is defined by the first power class (ii) the parameter P-Max for the first serving cell and (iii) a first tolerance, wherein
the second maximum output power $P_{PowerClass}$ is defined by one of the at least two power class, the one of the at least two power class corresponding to a band to which the first serving cell belongs.

3. A communication method of a terminal device, the communication method comprising:
receiving information which includes a parameter P-Max, the P-Max being used to limit the uplink transmission power on a first serving cell,
transmitting information which indicates at least two power classes, the at least two power classes corresponding to different bands, and
setting transmit power for a transmission in the first serving cell based on at least first maximum output power $P_{CMAX,c}$ for the first serving cell, the first maximum output power $P_{CMAX,c}$ being within a range based on at least (i) second maximum output power $P_{PowerClass}$ which is defined by the first power class, (ii) the parameter P-Max for the first serving cell and (iii) a first tolerance, wherein
the second maximum output power $P_{PowerClass}$ is defined by one of the at least two power class, the one of the at least two power class corresponding to a band to which the first serving cell belongs.

4. A communication method of a base station device, the communication method comprising:
transmitting information which includes a parameter P-Max, the P-Max being used to limit the uplink transmission power on a first serving cell, and
receiving, from a terminal device, information which indicates at least two power classes, the at least two power classes corresponding to different bands
transmit power for a transmission in the first serving cell by the terminal device is set based on at least first maximum output power $P_{CMAX,c}$ for the first serving cell, the first maximum output power $P_{CMAX,c}$ being within a range based on at least (i) second maximum output power $P_{PowerClass}$ which is defined by the first power class, (ii) the parameter P-Max for the first serving cell and (iii) a first tolerance, wherein
the second maximum output power $P_{PowerClass}$ is defined by one of the at least two power class, the one of the at least two power class corresponding to a band to which the first serving cell belongs.

* * * * *